(12) United States Patent
Maruyama

(10) Patent No.: US 8,144,344 B2
(45) Date of Patent: Mar. 27, 2012

(54) IMAGE FORMING APPARATUS THAT ARBITRATES IMAGE PROCESSING OPERATIONS

(75) Inventor: Teruyuki Maruyama, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1057 days.

(21) Appl. No.: 12/071,866

(22) Filed: Feb. 27, 2008

(65) Prior Publication Data

US 2008/0225322 A1    Sep. 18, 2008

(30) Foreign Application Priority Data

Mar. 16, 2007    (JP) ................. 2007-069575

(51) Int. Cl.
  G06F 15/00    (2006.01)
  G06F 3/12     (2006.01)
  G06K 1/00     (2006.01)
(52) U.S. Cl. ...................... 358/1.13; 358/1.1
(58) Field of Classification Search ............. 358/1.1, 358/1.15, 1.13, 1.6, 474, 505
   See application file for complete search history.

(56) References Cited

U.S. PATENT DOCUMENTS

| | | | |
|---|---|---|---|
| 5,907,669 A | 5/1999 | Yoshiura et al. | |
| 7,586,629 B2 | 9/2009 | Ohyama et al. | |
| 2003/0081253 A1* | 5/2003 | Sekiguchi et al. | 358/1.16 |

FOREIGN PATENT DOCUMENTS

| | | |
|---|---|---|
| JP | 09-261395 | 10/1997 |
| JP | 2001-275066 | 10/2001 |
| JP | 2002-359716 | 12/2002 |
| JP | 2005-122448 | 5/2005 |
| JP | 2005-150908 | 6/2005 |
| JP | 2006-050578 | 2/2006 |

OTHER PUBLICATIONS

Office action dated Aug. 30, 2011, in corresponding Japanese Patent Application No. 2007-069575.

* cited by examiner

*Primary Examiner* — Douglas Tran

(74) *Attorney, Agent, or Firm* — Harness, Dickey & Pierce, P.L.C.

(57) ABSTRACT

An image reading device generates first capability information indicative of an image processing operation that can be performed by an image processing section. An image printing device generates second capability information indicative of an image processing operation that can be performed by an image processing section. An image processing operation arbitrating section decides a combination of image processing operations to be performed by the image reading device and the image printing device and a sequence of the image processing operations based on the first and second capability information. The image processing operation arbitrating section transmits information on the decided combination and sequence to the image reading device and the image printing device.

17 Claims, 29 Drawing Sheets

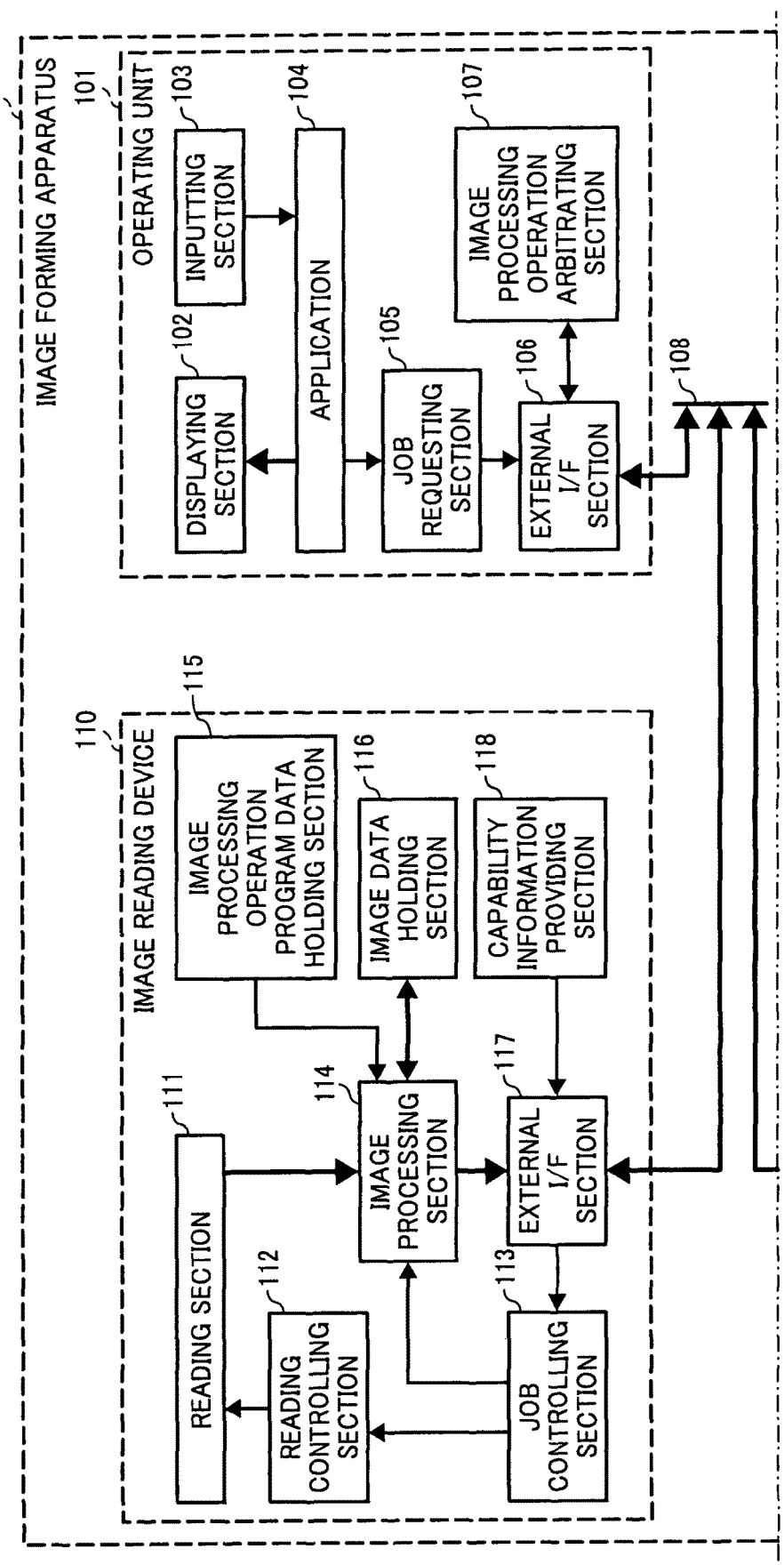

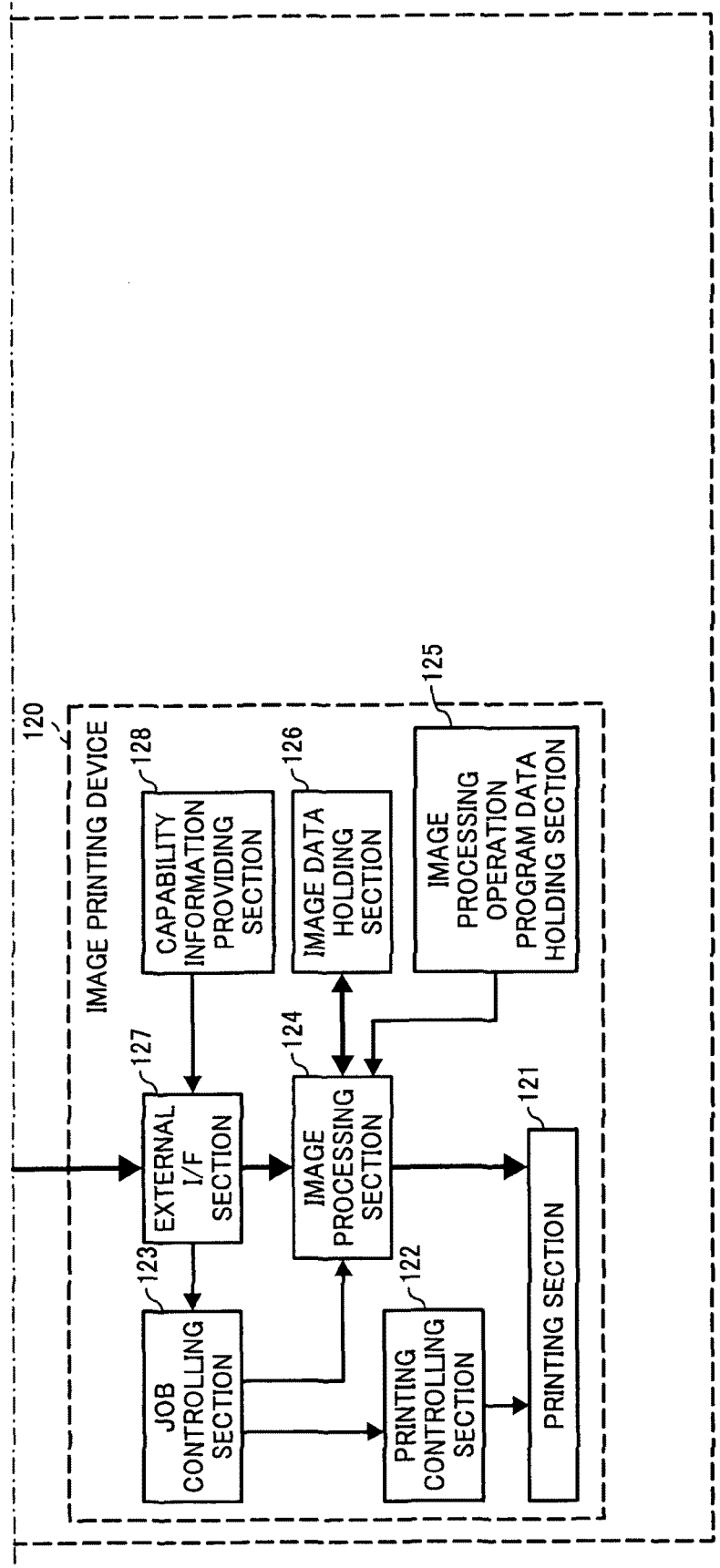

FIG. 6

```
POST /system HTTP/1.0
Content-Type: text/xml; charset=UTF-8
<?xml version="1.0"?>
<operation>
 <getCapability>
  <capabilitySort>imageProcess</capabilitySort>
 </getCapability>
</operation>
```

FIG. 7

```
HTTP/1.0 200 OK
Content-Type: text/xml; charset=UTF-8
<?xml version="1.0"encoding="UTF-8"?>
<operationResult>
 <getCapabilityResult>
  <isSucceeded>true</isSucceeded>
  <result>
  < xmlnx:sc="http://www.ricoh.co.jp/xmlns/scanner">>
   <capability>
    <imageProcess>
     <id>sc:icollect001</id>
     <inputDataType>sc:RawImage001</InputDatatype>
     <outputDataType>sc:StandardImage</outputDataType>
    </imageProcess>
    <imageProcess>
     <id>sc:filter002</id>
     <inputDataType>sc:StandardImage</InputDatatype>
     <outputDataType>sc:ImageF002</outputDataType>
    </imageProcess>
    <imageProcess>
     <id>sc:edit001</id>
     <inputDataType>sc:ImageFX</InputDatatype>
     <outputDataType>sc:ImageFX</outputDataType>
     <imageEditType>sc:ImageEdit001</imageEditType>
    </imageProcess>
     <id>sc:edit002</id>
     <inputDataType>sc:ImageFX</InputDatatype>
     <outputDataType>sc:ImageFX</outputDataType>
     <imageEditType>sc:ImageEdit002</imageEditType>
    </imageProcess>
   </capability>
  </result>
 </getCapabilityResult>
</operationResult>
```

FIG. 8

```
HTTP/1.0 200 OK
Content-Type: text/xml; charset=UTF-8
<?xml version="1.0" encoding="UTF-8"?>
<operationResult>
<getCapabilityResult>
<isSucceeded>true</isSucceeded>
<result>
<xmlns:pr="http://www.ricoh.co.jp/xmlns/printer" xmlnx:sc="http://www.ricoh.co.jp/xmlns/scanner">
<capability>
<imageProcess>
<id>pr:csconv001</id>
<inputDataType>sc:ImageF001</InputDatatype>
<outputDataType>pr:CMYKImage001</outputDataType>
</imageProcess>
<imageProcess>
<id>pr:csconv002</id>
<inputDataType>sc:ImageF002</InputDatatype>
<outputDataType>pr:CMYKImage002</outputDataType>
</imageProcess>
<imageProcess>
<id>pr:htone001</id>
<inputDataType>pr:CMYKImage001</InputDatatype>
<outputDataType>pr:rawImage003</outputDataType>
</imageProcess>
<imageProcess>
<id>pr:htone002</id>
<inputDataType>pr:CMYKImage002</InputDatatype>
<outputDataType>pr:rawImage003</outputDataType>
</imageProcess>
</capability>
</result>
</getCapabilityResult>
</operationResult>
```

FIG. 9

```
POST/system HTTP/1.0
Content-Type: text/xml; charset=UTF-8
<?xml version="1.0"?>
<operation>
 <setImageProcess>
    <xmlnx:sc="http://www.ricoh.co.jp/xmlns/scanner">
    <imageProcess>
    <id>sc:icollect001</id>
    </imageProcess>
    <imageProcess>
    <id>sc:filter002</id>
    </imageProcess>
 </setImageProcess>
</operation>
```

FIG. 10

```
POST/system HTTP/1.0
Content-Type: text/xml; charset=UTF-8
<?xml version="1.0" ?>
<operation>
 <setImageProcess>
    <xmlns:pr="http://www.ricoh.co.jp/xmlns/printer">
    <imageProcess>
    <id>pr:csconv002</id>
    </imageProcess>
    <imageProcess>
    <id>pr:htone002</id>
    </imageProcess>
 </setImageProcess>
</operation>
```

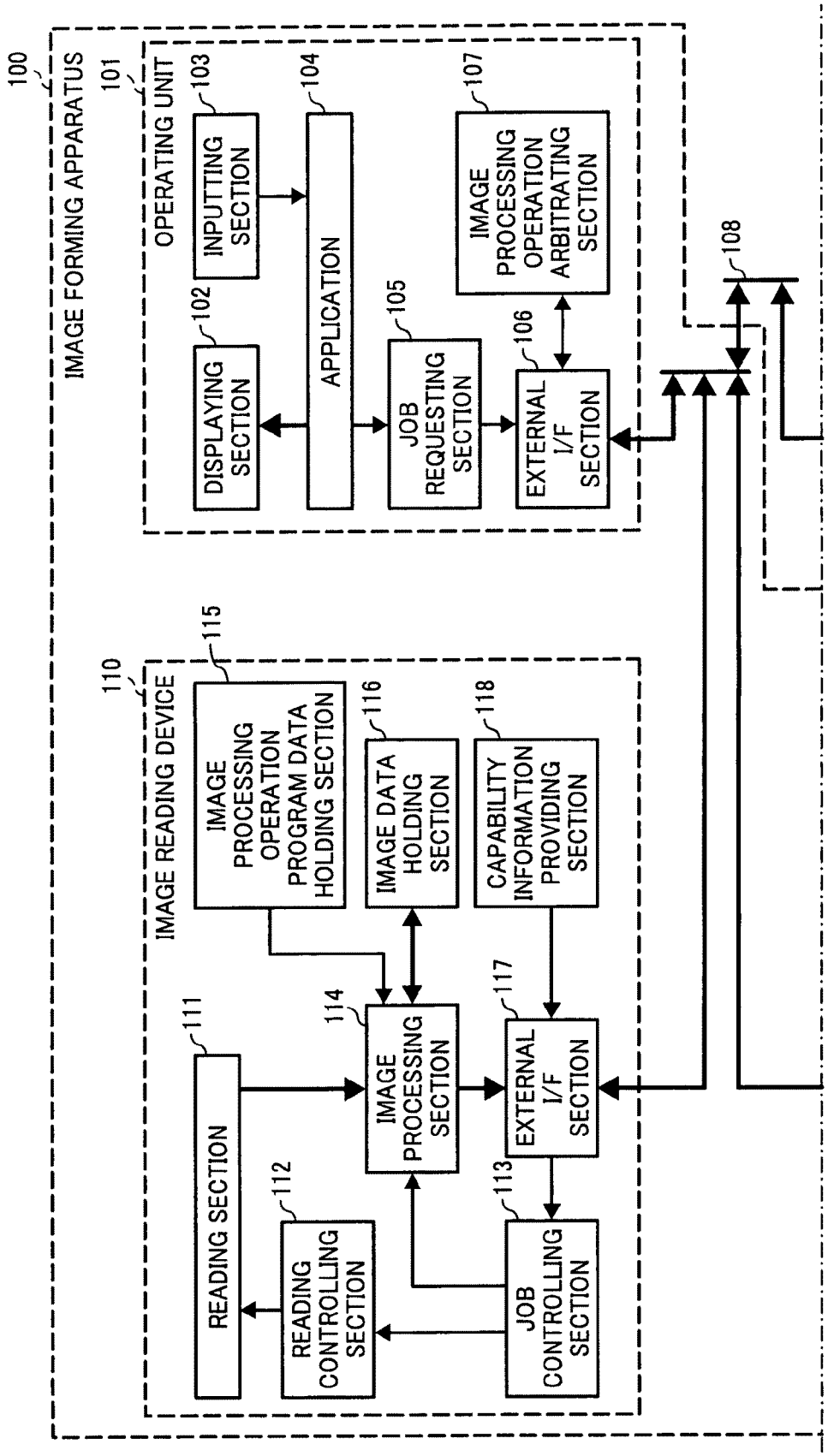

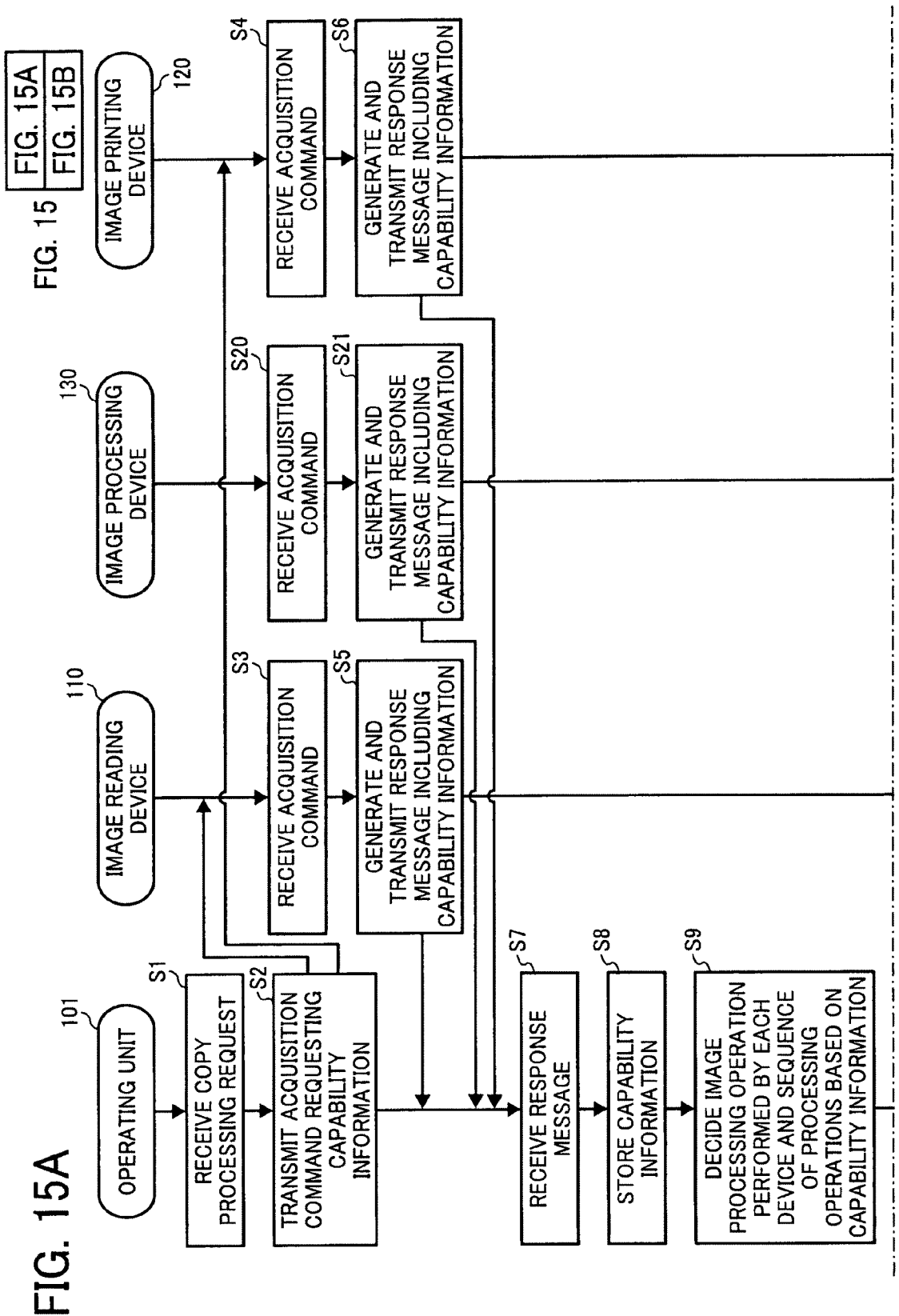

FIG. 16

```
HTTP/1.0 200 OK
Content-Type: text/xml; charset=UTF-8
<?xml version="1.0" encoding="UTF-8"?>
<operationResult>
 <getCapabilityResult>
  <isSucceeded>true</isSucceeded>
  <result>
  <xmlns:pr="http://www.ricoh.co.jp/xmlns/printer"
   xmlnx:sc="http://www.ricoh.co.jp/xmlns/scanner">
  <capability>
   <imageProcess>
    <id>sc:edit001</id>
    <inputDataType>sc:ImageFX</InputDatatype>
    <outputDataType>sc:ImageFX</outputDataType>
    <imageEditType>sc:ImageEdit001</imageEditType>
   </imageProcess>
    <id>sc:edit002</id>
    <inputDataType>sc:ImageFX</InputDatatype>
    <outputDataType>sc:ImageFX</outputDataType>
    <imageEditType>sc:ImageEdit002</imageEditType>
   </imageProcess>
   <imageProcess>
    <id>pr:csconv001</id>
    <inputDataType>sc:ImageF001</InputDatatype>
    <outputDataType>pr:CMYKImage001</outputDataType>
   </imageProcess>
   <imageProcess>
    <id>pr:csconv002</id>
    <inputDataType>sc:ImageF002</InputDatatype>
    <outputDataType>pr:CMYKImage002</outputDataType>
   </imageProcess>
   <imageProcess>
    <id>pr:htone001</id>
    <inputDataType>pr:CMYKImage001</InputDatatype>
    <outputDataType>pr:rawImage003</outputDataType>
   </imageProcess>
   <imageProcess>
    <id>pr:htone002</id>
    <inputDataType>pr:CMYKImage002</InputDatatype>
    <outputDataType>pr:rawImage003</outputDataType>
   </imageProcess>
  </capability>
  </result>
 </getCapabilityResult>
</operationResult>
```

FIG. 17

```
HTTP/1.0 200 OK
Content-Type: text/xml; charset=UTF-8
<?xml version="1.0" encoding="UTF-8"?>
<operationResult>
 <getCapabilityResult>
  <isSucceeded>true</isSucceeded>
  <result>
  <xmlnx:sc="http://www.ricoh.co.jp/xmlns/scanner">
   <capability>
    <imageProcess>
     <id>sc:icollect001</id>
     <inputDataType>sc:RawImage001</InputDatatype>
     <outputDataType>sc:StandardImage</outputDataType>
    </imageProcess>
    <imageProcess>
     <id>sc:filter002</id>
     <inputDataType>sc:StandardImage</InputDatatype>
     <outputDataType>sc:ImageF002</outputDataType>
    </imageProcess>
   </capability>
  </result>
 </getCapabilityResult>
</operationResult>
```

FIG. 18

```
HTTP/1.0 200 OK
Content-Type: text/xml; charset=UTF-8
<?xml version="1.0" encoding="UTF-8"?>
<operationResult>
 <getCapabilityResult>
  <isSucceeded>true</isSucceeded>
  <result>
  <xmlnx:pr="http://www.ricoh.co.jp/xmlns/printer">
   <capability>
    <imageProcess>
     <id>pr:htone002</id>
     <inputDataType>pr:CMYKImage002</InputDatatype>
     <outputDataType>pr:rawImage003</outputDataType>
    </imageProcess>
   </capability>
  </result>
 </getCapabilityResult>
</operationResult>
```

FIG. 19

```
POST /system HTTP/1.0
Content-Type: text/xml; charset=UTF-8
<?xml version="1.0"?>
<operation>
 <setImageProcess>
  <xmlnx:sc="http://www.ricoh.co.jp/xmlns/scanner">
   <imageProcess>
    <id>sc:icollect001</id>
   </imageProcess>
   <imageProcess>
    <id>sc:filter002</id>
   </imageProcess>
 </setImageProcess>
</operation>
```

FIG. 20

```
POST /system HTTP/1.0
Content-Type: text/xml; charset=UTF-8
<?xml version="1.0"?>
<operation>
 <setImageProcess>
  <xmlns:pr="http://www.ricoh.co.jp/xmlns/printer">
   <imageProcess>
    <id>pr:htone002</id>
   </imageProcess>
 </setImageProcess>
</operation>
```

FIG. 21

```
POST /system HTTP/1.0
Content-Type: text/xml; charset=UTF-8
<?xml version="1.0"?>
<operation>
 <setImageProcess>
  <xmlns:pr="http://www.ricoh.co.jp/xmlns/printer">
   <imageProcess>
    <id>pr:csconv002</id>
   </imageProcess>
 </setImageProcess>
</operation>
```

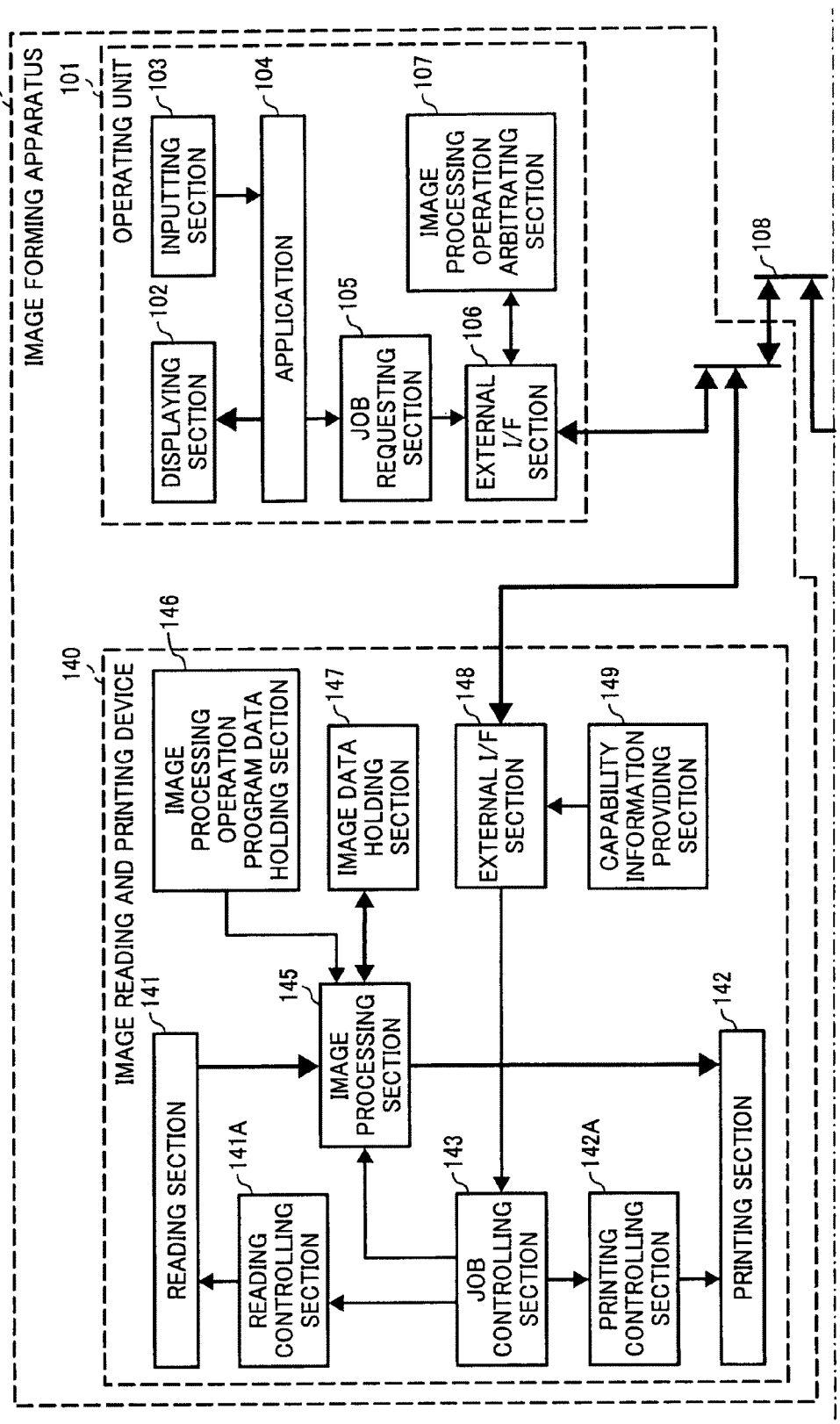

FIG. 25

```
HTTP/1.0 200 OK
Content-Type: text/xml; charset=UTF-8
<?xml version="1.0" encoding="UTF-8"?>
<operationResult>
<getCapabilityResult>
<isSucceeded>true</isSucceeded>
<result>
<xmlns:pr="http://www.ricoh.co.jp/xmlns/printer" xmlnx:sc="http://www.ricoh.co.jp/xmlns/scanner">
<capability>
<imageProcess>
<id>sc:icollect001</id>
<inputDataType>sc:RawImage001</InputDatatype>
<outputDataType>sc:StandardImage</outputDataType>
</imageProcess>
<imageProcess>
<id>sc:filter002</id>
<inputDataType>sc:StandardImage</InputDatatype>
<outputDataType>sc:ImageF002</outputDataType>
</imageProcess>
<imageProcess>
<id>pr:htone002</id>
<inputDataType>pr:CMYKImage002</InputDatatype>
<outputDataType>pr:rawImage003</outputDataType>
</imageProcess>
</capability>
</result>
</getCapabilityResult>
</operationResult>
```

FIG. 26

```
POST /system HTTP/1.0
Content-Type: text/xml; charset=UTF-8
<?xml version="1.0"?>
<operation>
<setImageProcess
xmlns:pr="http://www.ricoh.co.jp/xmlns/printer" xmlnx:sc="http://www.ricoh.co.jp/xmlns/scanner">
<imageProcess>
<id>sc:icollect001</id>
</imageProcess>
<imageProcess>
<id>sc:filter002</id>
</imageProcess>
<imageProcess>
<id>pr:htone002</id>
</imageProcess>
</setImageProcess>
</operation>
```

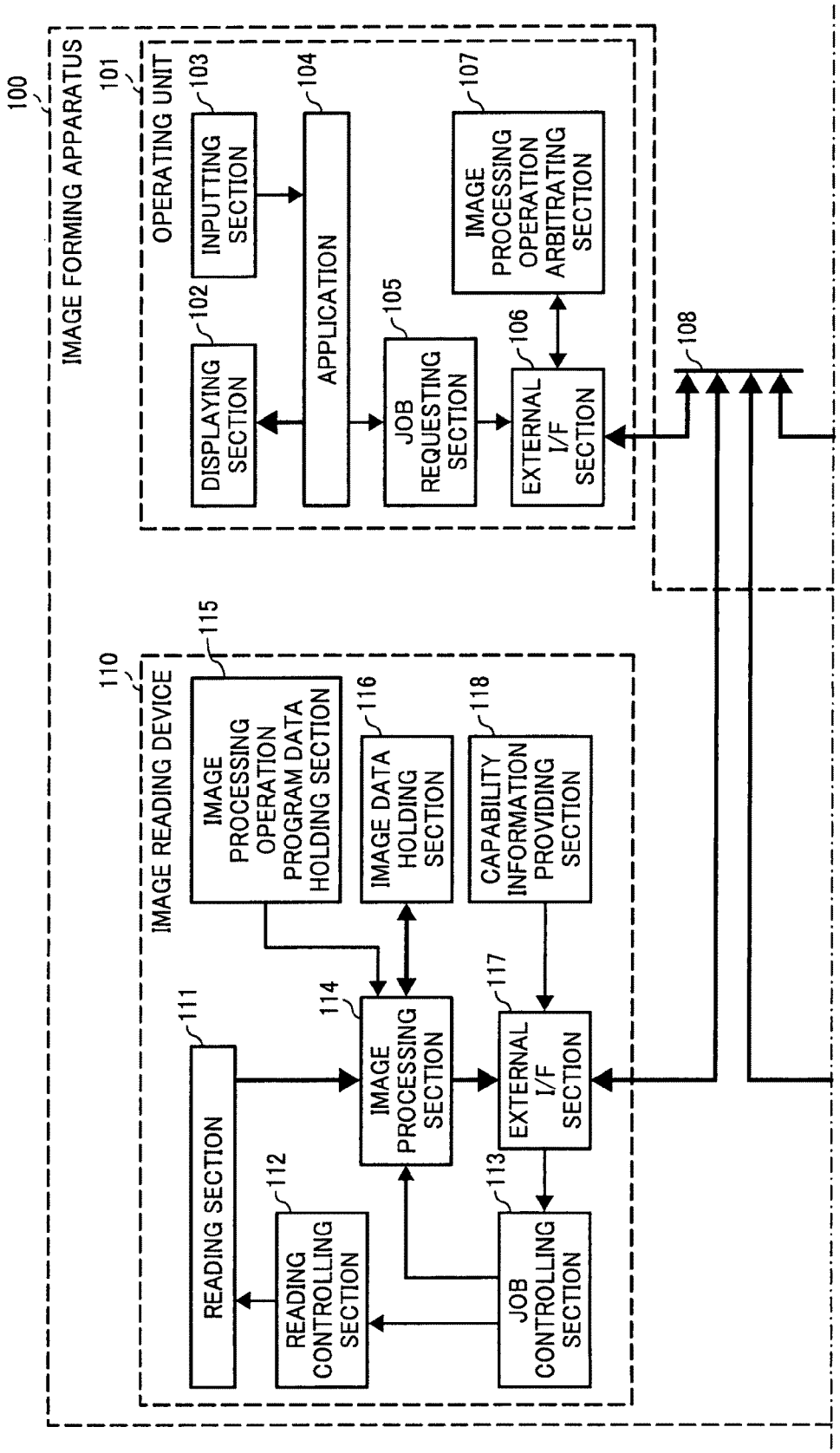

FIG. 28

- 115
- 150 IMAGE PROCESSING OPERATION A PROGRAM HOLDING SUB-SECTION | URL
- 151 IMAGE PROCESSING OPERATION B PROGRAM HOLDING SUB-SECTION | URL
- 152 IMAGE PROCESSING OPERATION C PROGRAM 1 HOLDING SUB-SECTION | URL
- 153 IMAGE PROCESSING OPERATION C PROGRAM 2 HOLDING SUB-SECTION | URL
- 154 IMAGE PROCESSING OPERATION A DATA HOLDING SUB-SECTION | URL
- 155 IMAGE PROCESSING OPERATION B DATA HOLDING SUB-SECTION | URL
- 156 IMAGE PROCESSING OPERATION C DATA 1 HOLDING SUB-SECTION | URL
- 157 IMAGE PROCESSING OPERATION C DATA 2 HOLDING SUB-SECTION | URL

FIG. 29

- 125
- SELECT:
  - 160 IMAGE PROCESSING OPERATION D PROGRAM 1 HOLDING SUB-SECTION | URL
  - 161 IMAGE PROCESSING OPERATION D PROGRAM 2 HOLDING SUB-SECTION | URL
- SELECT:
  - 162 IMAGE PROCESSING OPERATION E PROGRAM 1 HOLDING SUB-SECTION | URL
  - 163 IMAGE PROCESSING OPERATION E PROGRAM 2 HOLDING SUB-SECTION | URL
- SELECT:
  - 164 IMAGE PROCESSING OPERATION D DATA 1 HOLDING SUB-SECTION | URL
  - 165 IMAGE PROCESSING OPERATION D DATA 2 HOLDING SUB-SECTION | URL
- SELECT:
  - 166 IMAGE PROCESSING OPERATION E DATA 1 HOLDING SUB-SECTION | URL
  - 167 IMAGE PROCESSING OPERATION E DATA 2 HOLDING SUB-SECTION | URL

FIG. 31

```
HTTP/1.0 200 OK
Content-Type: text/xml; charset=UTF-8
<?xml version="1.0"encoding="UTF-8"?>
<operationResult>
 <getCapabilityResult>
  <isSucceeded>true</isSucceeded>
  <result>
  <xmlnx:sc="http://www.ricoh.co.jp/xmlns/scanner">>
   <capability>
    <imageProcess>
     <id>sc:icollect</id>
     <inputDataType>sc:RawImage001</InputDatatype>
     <processorId>DSP01</processorId>
    </imageProcess>
    <imageProcess>
     <id>sc:filter</id>
     <processorId>DSP01</processorId>
    </imageProcess>
    <imageProcess>
     <id>sc:edit</id>
     <processorId>DSP01</processorId>
    </imageProcess>
   </capability>
  </result>
 </getCapabilityResult>
</operationResult>
```

FIG. 32

```
HTTP/1.0 200 OK
Content-Type: text/xml; charset=UTF-8
<?xml version="1.0"encoding="UTF-8"?>
<operationResult>
 <getCapabilityResult>
  <isSucceeded>true</isSucceeded>
  <result>
  <xmlns:pr="http://www.ricoh.co.jp/xmlns/printer" xmlnx:sc="http://www.ricoh.co.jp/xmlns/scanner">
   <capability>
    <imageProcess>
     <id>pr:csconv</id>
     <processorId>DSP02</processorId>
    </imageProcess>
    <imageProcess>
     <id>pr:htone</id>
     <processorId>DSP02</processorId>
     <outputDataType>pr:rawImage003</outputDataType>
    </imageProcess>
   </capability>
  </result>
 </getCapabilityResult>
</operationResult>
```

FIG. 33

```
POST /system HTTP/1.0
Content-Type: text/xml; charset=UTF-8
<?xml version="1.0"?>
<operation>
 <setImageProcess>
  <xmlns:sc="http://www.ricoh.co.jp/xmlns/scanner">
   <imageProcess>
    <id>sc:icollect</id>
    <programUrl>http://www.ricoh.co.jp/progsrv/scanner/icollect001prg</programUrl>
    <paramUrl>http://www.ricoh.co.jp/progsrv/scanner/icollect001.prm</paramUrl>
   </imageProcess>
   <imageProcess>
    <id>sc:filter002</id>
    <programUrl>http://www.ricoh.co.jp/progsrv/scanner/filter002prg</programUrl>
    <paramUrl>http://www.ricoh.co.jp/progsrv/scanner/filter002.prm</paramUrl>
   </imageProcess>
 </setImageProcess>
</operation>
```

FIG. 34

```
POST /system HTTP/1.0
Content-Type: text/xml; charset=UTF-8
<?xml version="1.0"?>
<operation>
 <setImageProcess>
  <xmlns:sc="http://www.ricoh.co.jp/xmlns/scanner">
   <imageProcess>
    <id>sc:icollect</id>
    <programUrl>http://www.ricoh.co.jp/progsrv/scanner/icollect001prg</programUrl>
    <paramUrl>http://www.ricoh.co.jp/progsrv/scanner/icollect001.prm</paramUrl>
   </imageProcess>
   <imageProcess>
    <id>sc:filter002</id>
    <programUrl>http://www.ricoh.co.jp/progsrv/scanner/filter002prg</programUrl>
    <paramUrl>http://www.ricoh.co.jp/progsrv/scanner/filter002.prm</paramUrl>
   </imageProcess>
 </setImageProcess>
</operation>
```

IMAGE FORMING APPARATUS THAT ARBITRATES IMAGE PROCESSING OPERATIONS

CROSS-REFERENCE TO RELATED APPLICATIONS

The present application claims priority to and incorporates by reference the entire contents of Japanese priority document 2007-069575 filed in Japan on Mar. 16, 2007.

BACKGROUND OF THE INVENTION

1. Field of the Invention

The present invention relates to an image forming apparatus and an image forming method.

2. Description of the Related Art

Some image forming apparatuses perform image processing on image data read by a reading section, such as a scanner. A printing section of the image forming apparatus prints the processed image data. Among image forming apparatuses such as this, there is an image forming apparatus on which an application specific integrated circuit (ASIC) is mounted. The ASIC performs image processing specific to input characteristics of the reading section and output characteristics of the printing section within the image forming apparatus. Among image forming apparatuses such as this, there is an image forming apparatus that actualizes image processing using software, rather than hardware such as the ASIC (refer to, for example, Japanese Patent Application Laid-open No. 2005-122448). In this case as well, the reading section and the printing section of the image forming apparatus are identified and image processing specific to the input characteristics of the reading section and the output characteristics of the printing section is performed.

In recent years, technology has been developed in which an image forming apparatus is configured as follows. A reading device and a printing device that respectively perform image processing operations are connected by a network or the like. In a technology such as this, the reading device and the printing device can each perform various kinds of image processing operations. Therefore, characteristics (input characteristics) of the reading device and characteristics (output characteristics) of the printing device are difficult to identify when this technology is used. Optimal image processing performed based on the input characteristics and the output characteristics is desired.

SUMMARY OF THE INVENTION

It is an object of the present invention to at least partially solve the problems in the conventional technology.

According to an aspect of the present invention, there is provided an image forming apparatus including an image reading unit, an image printing unit, an operating unit, and a controlling unit. The image reading unit includes a reading section that reads an image recorded on a paper medium; a first image processing section that is able to perform one or more image processing operations from among a set of first image processing operations on the image read by the reading section to obtain a first processed image; and a first generating section that generates first image processing operation capability information indicative of the set of first image processing operations that the first image processing section is able to perform on an image. The image printing unit includes a second image processing section that performs one or more image processing operations from a set of second image processing operations on the first processed image to obtain a second processed image; a printing section that prints the second processed image; and a second generating section that generates second image processing operation capability information indicative of the set of second image processing operations that the second image processing section is able to perform on an image. The operating unit receives an operation input from a user. The controlling unit includes an acquiring section that, when the operating unit receives an operation input instructing printing, acquires the first image processing operation capability information from the first generating section and the second image processing operation capability information from the second generating section; a deciding section that decides which image processing operation is to be performed by each of the first image processing section and the second image processing section based on the first image processing operation capability information and the second image processing operation capability information acquired by the acquiring section; and a notifying section that generates image processing operation specifying information indicative of the image processing operations decided by the deciding section and transmits the image processing operation specifying information to the image reading unit and the image printing unit.

According to another aspect of the present invention, there is provided an image forming apparatus including an image reading unit, an image processing unit, an image printing unit, an operating unit, and a controlling unit. The image reading unit includes a reading section that reads an image recorded on a paper medium; a first image processing section that is able to perform one or more image processing operations from among a set of first image processing operations on the image read by the reading section to obtain a first processed image; and a first generating section that generates first image processing operation capability information indicative of the set of first image processing operations that the first image processing section is able to perform on an image. The image processing unit includes a third image processing section that is able to perform one or more image processing operations from among a set of third image processing operations on the first processed image to obtain a third processed image; and a third generating section that generates third image processing operation capability information indicative of the set of third image processing operations that the third image processing section is able to perform on an image. The image printing unit that prints the third processed image. The operating unit receives an operation input from a user. The controlling unit includes an acquiring section that, when the operating unit receives an operation input instructing printing, acquires the first image processing operation capability information from the first generating section and the third image processing operation capability information from the third generating section; a deciding section that decides which image processing operation is to be performed by each of the first image processing section and the third image processing section based on the first image processing operation capability information and the third image processing operation capability information acquired by the acquiring section; and a notifying section that generates image processing operation specifying information indicative of the image processing operations decided by the deciding section and transmits the image processing operation specifying information to the image reading unit and the image processing unit.

According to still another aspect of the present invention, there is provided an image forming apparatus including an image reading and printing unit, an operating unit, and a controlling unit. The image reading and printing unit includes a reading section that reads an image recorded on a paper medium; a first image processing section that is able to perform one or more image processing operations from among a set of first image processing operations on the image read by the reading section to obtain a first processed image; a first generating section that generates first image processing operation capability information indicative of the set of first image processing operations that the first image processing section is able to perform on an image; and a printing section that prints the first processed image. The operating unit receives an operation input from a user. The controlling unit includes an acquiring section that, when the operating unit receives an operation input instructing printing, acquires the first image processing operation capability information from the first generating section and acquires third image processing operation capability information indicative of a set of third image processing operations that a third image processing section is able to perform from the third image processing section that is able to perform one or more image processing operations from among the set of third image processing operations on an image; a deciding section that decides which image processing operation is to be performed by each of the first image processing section and the third image processing section based on the first image processing operation capability information and the third image processing operation capability information acquired by the acquiring section; and a notifying section that generates image processing operation specifying information indicative of the image processing operations decided by the deciding section and transmits the image processing operation specifying information to the image reading and printing unit and the third image processing section.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of an image forming apparatus according to a first embodiment of the present invention;

FIG. 6 is an example of contents of an XML-format acquisition command generated by the image processing operation arbitrating section;

FIG. 7 is an example of contents of an XML-format response message generated by a capability information providing section 118 shown in FIG. 1;

FIG. 8 is an example of contents of an XML-format response message generated by a capability information providing section shown in FIG. 1;

FIG. 9 is an example of contents of a setting command 1 generated by the image processing operation arbitrating section;

FIG. 10 is an example of contents of a setting command 2 generated by the image processing operation arbitrating section;

FIG. 16 is an example of contents of an XML-format response message generated by a capability information providing section shown in FIG. 11;

FIG. 17 is an example of contents of an XML-format response message generated by the capability information providing section shown in FIG. 11;

FIG. 18 is an example of contents of an XML-format response message generated by the capability information providing section shown in FIG. 11;

FIG. 19 is an example of contents of a setting command 3 generated by an image processing operation arbitrating section shown in FIG. 11;

FIG. 20 is an example of contents of a setting command 4 generated by the image processing operation arbitrating section shown in FIG. 11;

FIG. 21 is an example of contents of a setting command 5 generated by the image processing operation arbitrating section shown in FIG. 11;

FIG. 25 is an example of an XML-format response message generated by a capability information providing section shown in FIG. 22;

FIG. 26 is an example of contents of a setting command 6 generated by an image processing operation arbitrating section shown in FIG. 22;

FIG. 28 is a block diagram of an image processing operation program data holding section shown in FIG. 27;

FIG. 29 is a block diagram of an image processing operation program data holding section shown in FIG. 27;

FIG. 31 is an example of contents of a response message generated by the capability information providing section shown in FIG. 27;

FIG. 32 is an example of contents of a response message generated by the capability information providing section shown in FIG. 27;

FIG. 33 is an example of contents of a setting command 8 generated by the image processing operation arbitrating section shown in FIG. 27; and FIG. 34 is an example of contents of a setting command 9 generated by the image processing operation arbitrating section shown in FIG. 27.

DETAILED DESCRIPTION OF THE PREFERRED EMBODIMENTS

Figure 2:
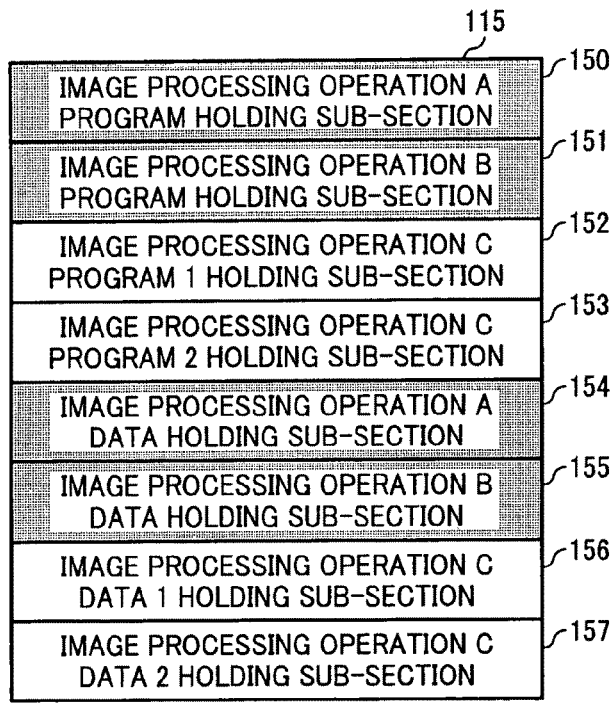
FIG. 2 is a block diagram of an image processing operation program data holding section shown in FIG. 1.

Exemplary embodiments of the present invention are below described with reference to the attached drawings.

FIG. 1 is a block diagram of an example of a configuration of an image forming apparatus 100 according to a first embodiment of the present invention. The image forming apparatus 100 includes an operating unit 101, an image reading device 110, and an image printing device 120 that are connected by a network 108. The operating unit 101 receives an operation input from a user. The operating unit 101 respectively obtains pieces of capability information, described hereafter, from the image reading device 110 and the image printing device 120. The operating unit 101 decides an image processing operation to be performed by the image reading device 110 and an image processing operation to be performed by the image printing device 120. The operating unit 101 instructs the image reading device 110 and the image printing device 120 to perform the respective image processing operations. The image reading device 110 reads an image recorded on a paper medium. The image reading device 110 transmits capability information, described-hereafter, to the operating unit 101. The image reading device 110 also performs image processing based on the instruction from the operating unit 101. The image printing device 120 transmits capability information, described hereafter, to the operating unit 101. The image printing device 120 performs image processing on image data processed by the image reading device 110, based on the instruction from the operating unit 101. The image printing device 120 also prints an image onto a paper medium. A device identifier (ID) is for identifying each device and it is associated in advance with the image reading device 110 and the image printing device 120.

Next, a configuration of the image reading device 110 will be described. The image reading device 110 includes a reading section 111, a reading controlling section 112, a job controlling section 113, an image processing section 114, an image processing operation program data holding section 115, an image data holding section 116, an external interface (I/F) section 117, and the capability information providing section 118. The reading section 111 reads the image recorded onto the paper medium. The reading controlling section 112 controls the reading of the image performed by the reading section 111. The job controlling section 113 manages the reading of the image performed by the reading section 11 as a job and controls the job. The image processing section 114 performs image processing on the image read by the reading section 111. The image processing operation program data holding section 115 stores therein an image processing operation program run when the image processing section 114 performs an image processing operation. The image processing operation program data holding section 115 also stores therein parameters and the like used when the program is run. Details of a configuration of the image processing operation program data holding section 115 will be described hereafter. The image data holding section 116 stores therein the image read by the reading section 111 and the image data processed by the image processing section 114. The capability information providing section 118 generates information (capability information [image processing operation capability information]) on an image processing operation that can be performed by the image processing section 114, based on the image processing operation program stored in the image processing operation program data holding section 115. The capability information providing section 118 transmits the generated capability information to the operating unit 101, via the external I/F section 117. The capability information includes a processing operation ID for identifying the image processing operation, a type of image that can be supported as an input for the image processing operation (input image type), a type of image obtained as a result of the image processing operation (output image type), and a type of image editing operation (image editing type). The external I/F section 117 controls communication with the image printing device 120 and the operating unit 101 performed via the network 108.

Next, an internal configuration of the image processing operation program data holding section 115 of the image reading device 110 will be described. FIG. 2 is a block diagram of an example of the internal configuration of the image processing operation program data holding section 115. The image processing section 114 of the image reading device 110 has a function to perform one or more of an image processing operation A, an image processing operation B, and image processing operations C. The image processing operation A is, for example, modulation transfer function (MTF) correction and γ-correction. The image processing operation B is, for example, a smoothing filter. The image processing operations C can be, for example, two kinds of image processing operations. For example, one processing operation is image rotation. The other processing operation is image compositing. The image processing operation A, the image processing operation B, and the image processing operations C are respectively associated with the processing operation ID. In a configuration such as this, the image processing operation program data holding section 115 includes an image processing operation A program holding sub-section 150, an image processing operation B program holding sub-section 151, an image processing operation C program 1 holding sub-section 152, and an image processing operation C program 2 holding sub-section 153. The image processing operation A program holding sub-section 150 stores therein a program run when the image processing operation A is performed. The image processing operation B program holding sub-section 151 stores therein a program run when the image processing operation B is performed. The image processing operation C program 1 holding sub-section 152 stores therein a program C1 run when image rotation within the image processing operations C is performed. The image processing operation C program 2 holding sub-section 153 stores therein a program C2 run when image compositing within the image processing operations C is performed. The image processing operation program data holding section 115 also includes an image processing operation A data holding sub-section 154, an image processing operation B data holding sub-section 155, an image processing operation C data 1 holding sub-section 156, and an image processing operation C data 2 holding sub-section 157. The image processing operation A data holding sub-section 154 stores therein data such as parameters used when the image processing operation A is performed. The image processing operation B data holding sub-section 155 stores therein data such as parameters used when the image processing operation B is performed. The image processing operation C data 1 holding sub-section 156 stores therein data such as parameters used when image rotation within the image processing operations C is performed. The image processing operation C data 2 holding sub-section 157 stores therein data such as parameters used when image compositing within the image processing operations C is performed.

The image processing section 114 is required to perform the image processing operation A and the image processing operation B. The image processing section 114 selectively performs the image processing operations C depending, for example, on a request from the user made through an inputting section 103. Therefore, the image processing section 114 is required to use the program stored in the image processing operation A program holding sub-section 150, the program stored in the image processing operation B program holding sub-section 151, the data stored in the image processing operation A data holding sub-section 154, and the data stored in the image processing operation B data holding sub-section 155. The image processing section 114 selectively uses the program stored in the image processing operation C program 1 holding sub-section 152, the program stored in the image processing operation C program 2 holding sub-section 153, the data stored in the image processing operation C data 1 holding sub-section 156, and the data stored in the image processing operation C data 2 holding sub-section 157.

Next, a configuration of the image printing device 120 will be described with reference once again to FIG. 1. The image printing device 120 includes a printing section 121, a printing controlling section 122, a job controlling section 123, an image processing section 124, an image processing operation program data holding section 125, an image data holding section 126, an external I/F section 127, and the capability information providing section 128. The printing section 121 prints the image onto the paper medium. The printing controlling section 122 controls the printing performed by the printing section 121. The job controlling section 123 manages the printing performed by the printing section 121 as a job and controls the job. The image processing section 124 performs image processing on the image that is a printing subject. The image processing operation program data holding section 125 stores therein an image processing operation program run when the image processing section 124 performs image processing, parameters used when the program is run, and the like. Details of the image processing operation program data holding section 125 will be described hereafter. The image data holding section 126 stores therein the image that is the printing subject and image data processed by the image processing section 124. The capability information providing section 128 generates information (capability information) on an image processing operation that can be performed by the image processing section 124, based on the image processing operation program stored in the image processing operation program data holding section 125. The capability information providing section 128 transmits the capability information to the operating unit 101, via the external I/F section 127. The external I/F section 127 controls communication with the image reading device 110 and the operating unit 101 performed via the network 108.

Figure 3:
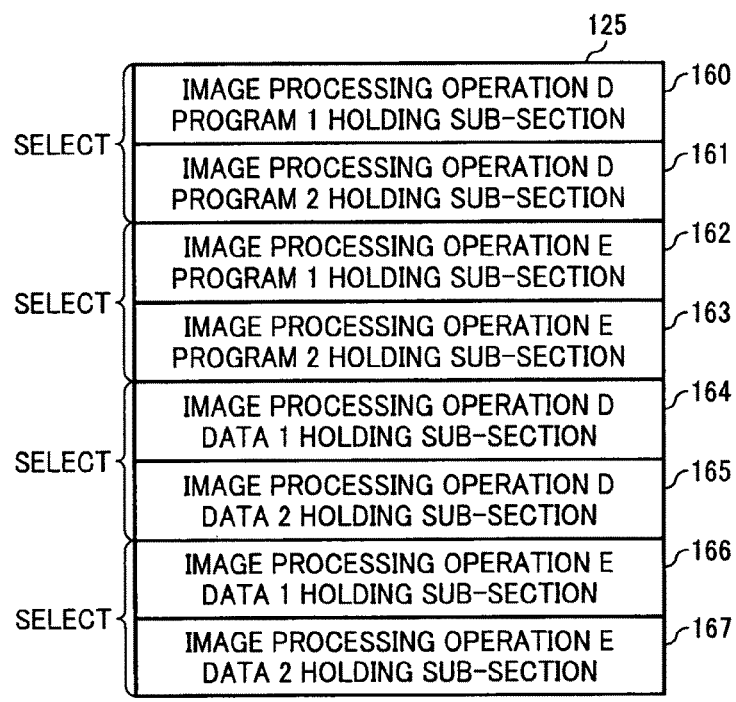
FIG. 3 is a block diagram of an image processing operation program data holding section shown in FIG. 1.

Next, an internal configuration of the image processing operation program data holding section 125 of the image printing device 120 will be described. FIG. 3 is a block diagram of an example of the internal configuration of the image processing operation program data holding section 125. The image processing section 124 of the image printing device 120 can perform an image processing operation D and an image processing operation E. The image processing operation D is, for example, a color space conversion from a red-green-blue (RBG) space to a cyan-magenta-yellow-black (CMYK) space. The image processing operation E is, for example, a gradation process. The image processing operation D and the image processing operation E are respectively associated with the processing operation ID. In a configuration such as this, the image processing operation program data holding section 125 includes an image processing operation D program 1 holding sub-section 160, an image processing operation D program 2 holding sub-section 161, an image processing operation E program 1 holding sub-section 162, and an image processing operation E program 2 holding sub-section 163. The image processing operation D program 1 holding sub-section 160 stores therein a program D1 run when the image processing operation D is performed. The image processing operation D program 2 holding sub-section 161 stores therein a program D2 run when the image processing operation D is performed. The image processing operation E program 1 holding sub-section 162 stores therein a program E1 run when the image processing operation E is performed. The image processing operation E program 2 holding sub-section 163 stores therein a program E2 run when the image processing operation E is performed. The image processing operation program data holding section 125 also includes an image processing operation D data 1 holding sub-section 164, an image processing operation D data 2 holding sub-section 165, an image processing operation E data 1 holding sub-section 166, and an image processing operation E data 2 holding sub-section 167. The image processing operation D data 1 holding sub-section 164 stores therein data such as parameters used when the program D1, run when the image processing operation D is performed, is run. The image processing operation D data 2 holding sub-section 165 stores therein data such as parameters used when the program D2, run when the image processing operation D is performed, is run. The image processing operation E data 1 holding sub-section 166 stores therein data such as parameters used when the program E1, run when the image processing operation E is performed, is run. The image processing operation E data 2 holding sub-section 167 stores therein data such as parameters used when the program E2, run when the image processing operation E is performed, is run.

The program D1 or the program D2 of the programs run when the image processing operation D is performed can be selectively run. The program E1 or the program E2 of the programs run when the image processing operation E is performed can also be selectively run. An image processing operation arbitrating section 107 of the operating unit 101, described hereafter, decides the program to be selected.

Next, a configuration of the operating unit 101 will be described with reference once again to FIG. 1. The operating unit 101 includes a displaying section 102, the inputting section 103, an application 104, a job requesting section 105, an external I/F section 106, and the image processing operation arbitrating section 107. The displaying section 102 is a liquid crystal display panel or the like. The displaying section 102 displays an operating screen as a user interface. The inputting section 103 is a keyboard or a touch-sensor. The inputting section 103 receives the operation input from the user. The displaying section 102 and the inputting section 103 can be integrally formed into a touch screen. The application 104 is used to actualize a copy processing function. When a copy processing request is received from the inputting section 103, the job requesting section 105 requests that the image reading device 110 perform a reading job required for a copy processing operation. The job requesting section 105 also requests that the image printing device 120 perform a printing job. When the copy processing request is received from the inputting section 103, the image processing operation arbitrating section 107 receives the pieces of capability information from the image reading device 110 and the image printing device 120. The image processing operation arbitrating section 107 decides a combination of image processing operations required for copy processing and a sequence of the image processing operations. The image processing operation arbitrating section 107 transmits the information on the decided combination and sequence to the image reading device 110 and the image printing device 120. The external I/F section 106 controls communication with the image reading device 110 and the image printing device 120 performed via the network 108.

Figure 4:
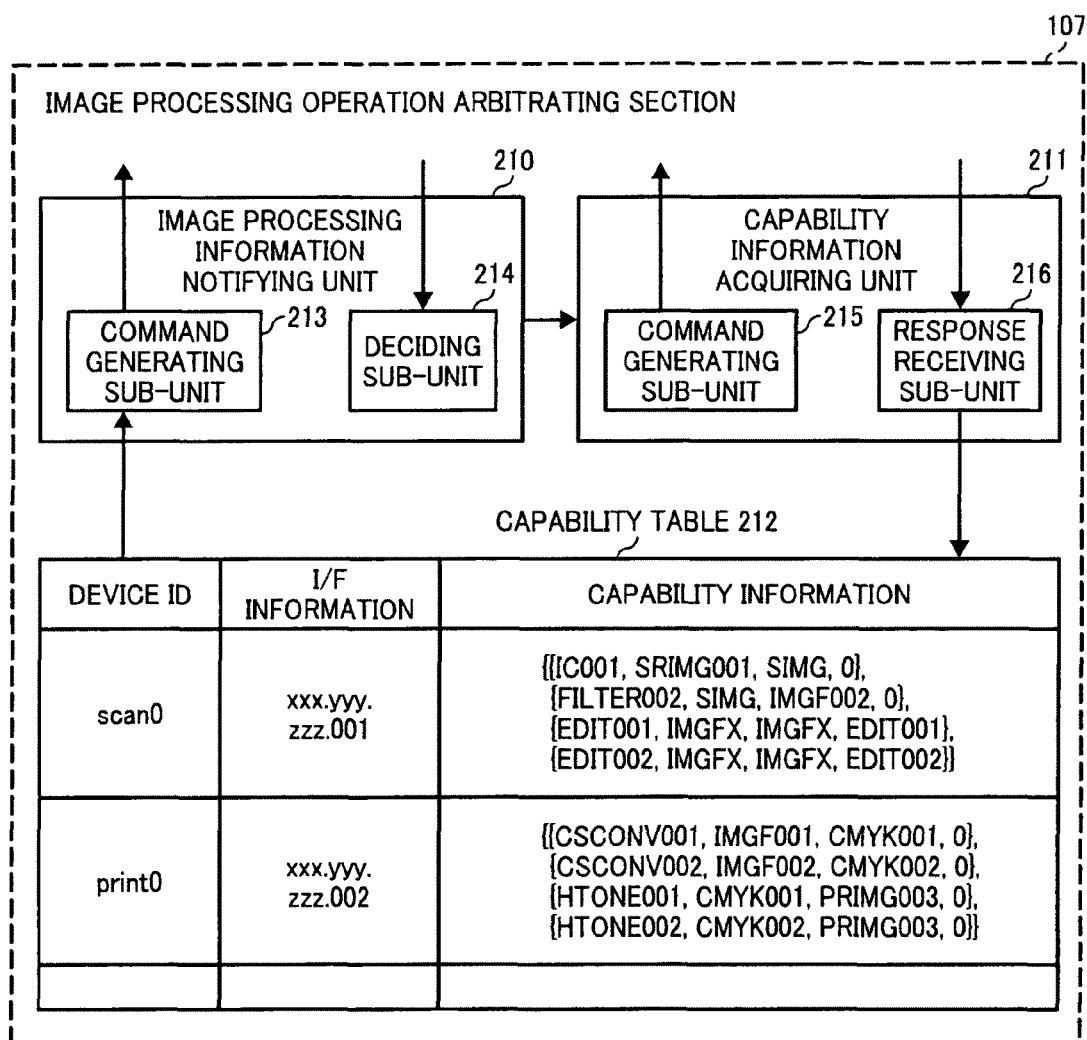
FIG. 4 is a block diagram of an image processing operation arbitrating section shown in FIG. 1.

Next, an internal configuration of the image processing operation arbitrating section 107 of the operating unit 101 will be described. FIG. 4 is a block diagram of an example of the internal configuration of the image processing operation arbitrating section 107. The image processing operation arbitrating section 107 includes a capability information acquiring unit 211, a capability table 212, and an image processing information notifying unit 210. The capability information acquiring unit 211 acquires the pieces of capability information from the image reading device 110 and the image printing device 120. The capability table 212 stores therein the pieces of capability information acquired by the capability information acquiring unit 211. For example, as shown in FIG. 4, the capability information from the image reading device 110 and the capability information from the image printing device 120 are stored in a table format. In the capability table 212, the device ID of the image reading device 110 and of the image printing device 120 that identify each device, I/F information related to an interface connecting each device, and the capability information are associated. An IP address is used as the I/F information. As described above, the capability information includes the processing operation ID of the image processing operation, the input image type, the output image type, and the image editing type. Specifically, a device ID 'scan0' indicates the device ID associated with the image reading device 110. 'xxx.yyy.zzz.001' indicates the IP address assigned to the image reading device 110. Several pieces of capability information of the image reading device 110 are stored. In the pieces of capability information shown in an uppermost row in FIG. 4, in sequence from left to right, 'IC001' indicates the processing operation ID associated with the image processing operation A. 'SRIMG001' indicates the input image type. 'SIMG' indicates the output image type. '0' indicates the image editing type. '0' indicates that a type is not specified.

Based on the pieces of capability information stored in the capability table 212, the image processing information notifying unit 210 decides the combination and the sequence of the image processing operations performed by the image reading device 110 and the image printing device 120. The image processing information notifying unit 210 transmits the information on the combination and the sequence to the image reading device 110 and the image printing device 120.

More specifically, the capability information acquiring unit 211 includes a command generating sub-unit 215 and a response receiving sub-unit 216. The command generating sub-unit 215 generates an extensible markup language (XML)-format acquisition command for acquiring the capability information. The command generating sub-unit 215 transmits acquisition commands to the image reading device 110 and the image printing device 120 by hypertext transfer protocol (http) communication, via the external I/F section 106. The response receiving sub-unit 216 receives the pieces of capability information transmitted from the image reading device 110 and the image printing device 120. The response receiving sub-unit 216 interprets the received capability information and stores the capability information in the capability table 212.

The image processing information notifying unit 210 includes a command generating sub-unit 213 and a deciding sub-unit 214. The deciding sub-unit 214 decides the image processing operation to be performed by the image reading device 110 and the image processing operation to be performed by the image printing device 120 using the pieces of capability information stored in the capability table 212. The command generating sub-unit 213 generates an XML-format image processing setting command (image processing specifying information) as image processing information indicating the combination and the sequence of the image processing operations decided by the deciding sub-unit 214. The command generating sub-unit 213 transmits setting commands to the image reading device 110 and the image printing device 120 by http communication, via the external I/F section 106.

Figure 5:
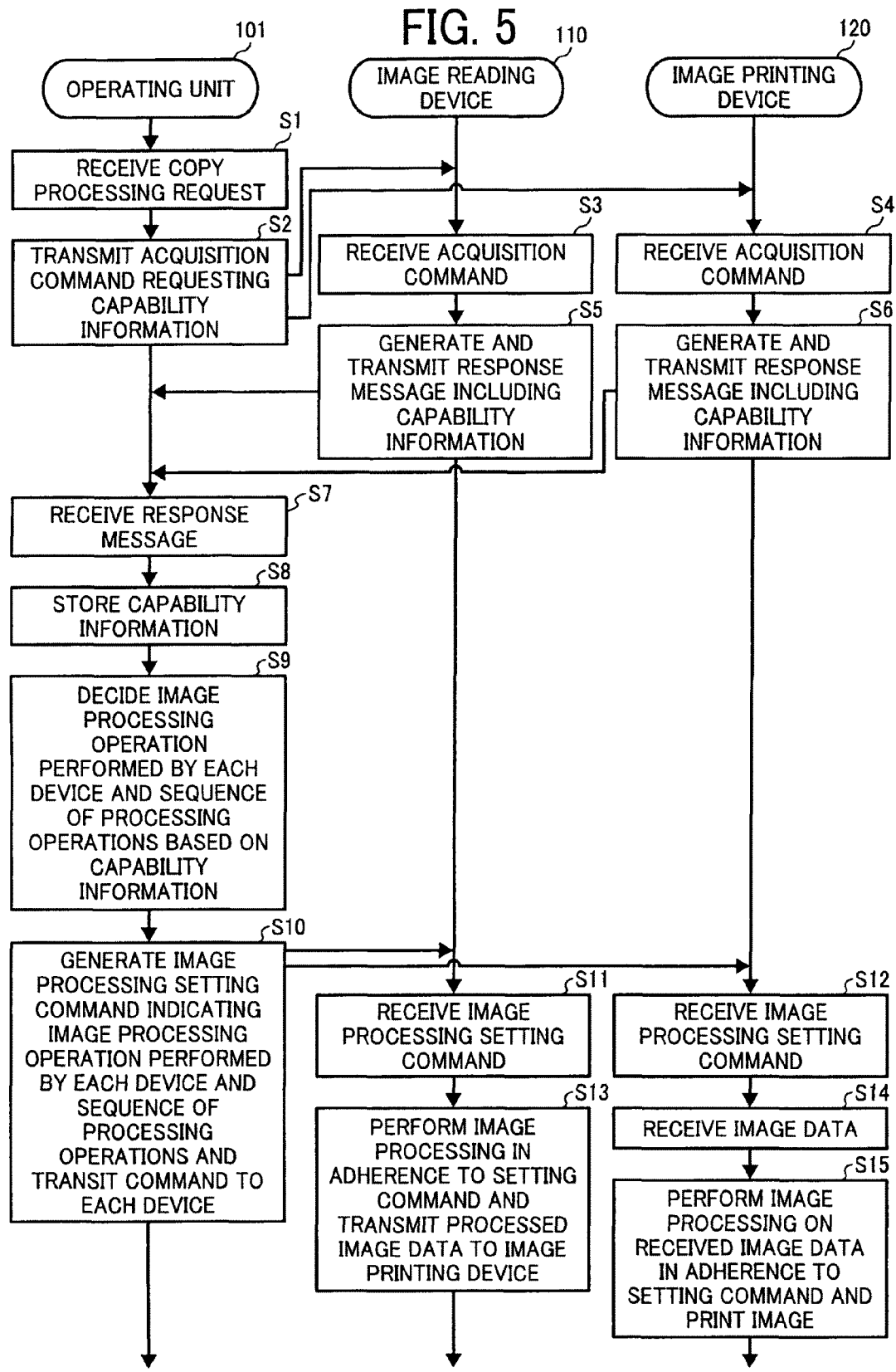
FIG. 5 is a flowchart of procedures in a copy processing operation according to the first embodiment.

Next, the copy processing operation according to the first embodiment will be described. FIG. 5 is a flowchart of the copy processing operation. When the operating unit 101 of the image forming apparatus 100 receives the operation input from the user requesting copy processing, via the inputting section 103 (Step S1), the image processing operation arbitrating section 107 generates the XML-format acquisition command that requests acquisition of the capability information from the image reading device 110 and the image printing device 120. FIG. 6 is a diagram of an example of the XML-format acquisition command generated by the image processing operation arbitrating section 107. <getCapability></getCapability> indicates that the command is given to request the acquisition of the capability information. <capabilitySort>imageProcess</capabilitySort> indicates that the capability information to be acquired is related to image processing. The image processing operation arbitrating section 107 respectively transmits acquisition commands such as that described above to the image reading device 110 and the image printing device 120 by http communication, via the external I/F section 106 (Step S2).

At the same time, when the image reading device 110 receives the acquisition command transmitted from the operating unit 101 via the external I/F section 117 (Step S3), the capability information providing section 118 generates an XML-format response message including information on the image processing operation that can be performed by the image processing section 114 (capability information), based on the image processing operation program stored in the image processing operation program data holding section 115. FIG. 7 is a diagram of an example of the XML-format response message generated by the capability information providing section 118. <getCapabilityResult> indicates that message a response to the getCapability command in the acquisition command. <xmlnx:sc> indicates an attribute of the image reading device 110 (sc [scanner], herein). A list of pieces of capability information is shown in rows between <capability> and </capability>. In the list, the capability information for each image processing operation are shown in rows between <imageProcess> and </imageProcess>. Each piece of capability information includes the processing operation ID <ID>, the input image type <inputDataType>, the output image type <outputDataType>, and the image editing type <imageEditType>. The processing operation ID <ID> is used to identify each image processing operation. The input image type <inputDataType> indicates the type of image that can be supported as an input for the image processing operation. The output image type <outputDataType> indicates the type of image that can be obtained as a result of image processing operation. The processing operation ID indicates that images that are uniformly the specified image type for image processing have the same characteristics. 'sc: ImageFX' indicated as <inputDataType> and <outputDataType> indicates an arbitrary image type. The image can be of any type as long as the image has undergone filter processing. The capability information providing section 118 transmits a response message including the capability information, such as that described above, to the operating unit 101 by http communication, via the external I/F section 117 (Step S5).

Similarly, in the image printing device 120, when the acquisition command transmitted from the operating unit 101 is received via the external I/F section 127 (Step S4), the capability information providing section 128 generates the XML-format response message including the information on the image processing operation that can be performed by the image processing section 124 (capability information), based on the image processing operation program stored in the image processing operation program data holding section 125. FIG. 8 is a diagram of an example of the XML-format response message generated by the capability information providing section 128. <xmlnx:pr> indicates an attribute of the image printing device 120 (pr [printer], herein). The configuration of the response message other than <xmlnx:pr> is similar to that of the response message shown in the FIG. 7. Therefore, explanations thereof will be omitted. The capability information providing section 128 transmits a response message including the capability information, such as that described above, to the operating unit 101 by http communication, via the external I/F section 127 (Step S6).

When the image processing operation arbitrating section 107 of the operating unit 101 receives the response message transmitted from the image reading device 110 and the response message transmitted from the image printing device 120 via the external I/F section 106 (Step S7), the image processing operation arbitrating section 107 stores the capability information included in each response message in the capability table 212 (Step S8). Using the pieces of capability information, the image processing operation arbitrating section 107 decides the combination and the sequence of the image processing operations to be performed by the image reading device 110 and the image printing device 120 (Step S9). Specifically, a combination and sequence of the image processing operations in which the output image type and the input image type match is determined for each image processing operation indicated in respective pieces of capability information. The image processing operation arbitrating section 107 decides the determined combination and sequence to be an optimal image processing flow. The image processing operation arbitrating section 107 generates an XML-format image processing setting command (setting command 1) that is image processing information indicating the image processing operations to be performed by the image reading device 110 and the sequence of the image processing operations. The image processing operation arbitrating section 107 also generates an XML-format image processing command (setting command 2) that is image processing information indicating the image processing operations to be performed by the image printing device 120 and the sequence of the image processing operations. FIG. 9 is a diagram of an example of the setting command 1 generated by the image processing operation arbitrating section 107. <setImageProcess></setImageProcess> indicates that the command is given to set the image processing operations. Regarding the image processing operations to be performed by the image reading device 110, the processing operation ID <ID> of the image processing operation is shown in rows between <imageProcess> and </imageProcess> for each sequence. Specifically, a processing operation ID 'icollect001' of the image processing operation A and a processing ID 'filter002' of the image processing operation B are indicated as the image processing operations to be performed by the image reading device 110. FIG. 10 is a diagram of an example of the setting command 2 generated by the image processing operation arbitrating section 107. As in FIG. 9, regarding the image processing operations to be performed by the image printing device 120, the processing operation ID <ID> of the image processing operation is shown in rows between <imageProcess> and </imageProcess> for each sequence. Specifically, a processing operation ID 'csconv002' is indicated as the image processing operation to be performed by the image printing device 120 when the program D2 is run when the image processing operation D is performed. A processing operation ID 'htone002' is indicated as the image processing operation to be performed by the image printing device 120 when the program E2 is run when the image processing operation E is performed. The image processing operation arbitrating section 107 transmits the setting command 1 to the image reading device 110 and the setting command 2 to the image printing device 120 via the external I/F section 106 (Step S10).

When the image reading device 110 receives the setting command 1 transmitted from the operating unit 101 (Step S11), the image processing section 114 performs an image processing operation (the image processing operation A or the image processing operation B, herein) in adherence to the setting command 1 on the image read by the reading section 111. The image reading device 110 stores the processed image data in the image data holding section 116. The image reading device 110 transmits the processed image data to the image printing device 120 via the external I/F section 117 (Step S13). When the image printing device 120 receives the setting command 2 transmitted from the operating unit 101 (Step S12) and receives the processed image data from the image reading device 110 (Step S14), the image processing section 124 performs an image processing operation (the image processing operation using the program D2 as the image processing operation D and the image processing operation using the program E2 as the image processing operation E, herein) in adherence to the setting command 2 on the image data. The image printing device 120 prints the processed image data onto a paper medium (Step S15).

As described above, when the image reading device 110 and the image printing device 120 are connected by the network 108, the optimal image processing flow adhering to the characteristics (input characteristics) of the image reading device 110 and the characteristics (output characteristics) of the image printing device 120 can be actualized by the combination of the image processing operations to be performed by the image reading device 110 and the image processing operations to be performed by the image printing device 120 and the sequence of the image processing operations being decided using the capability information of the image reading device 110 and the image printing device 120.

Figure 11B:
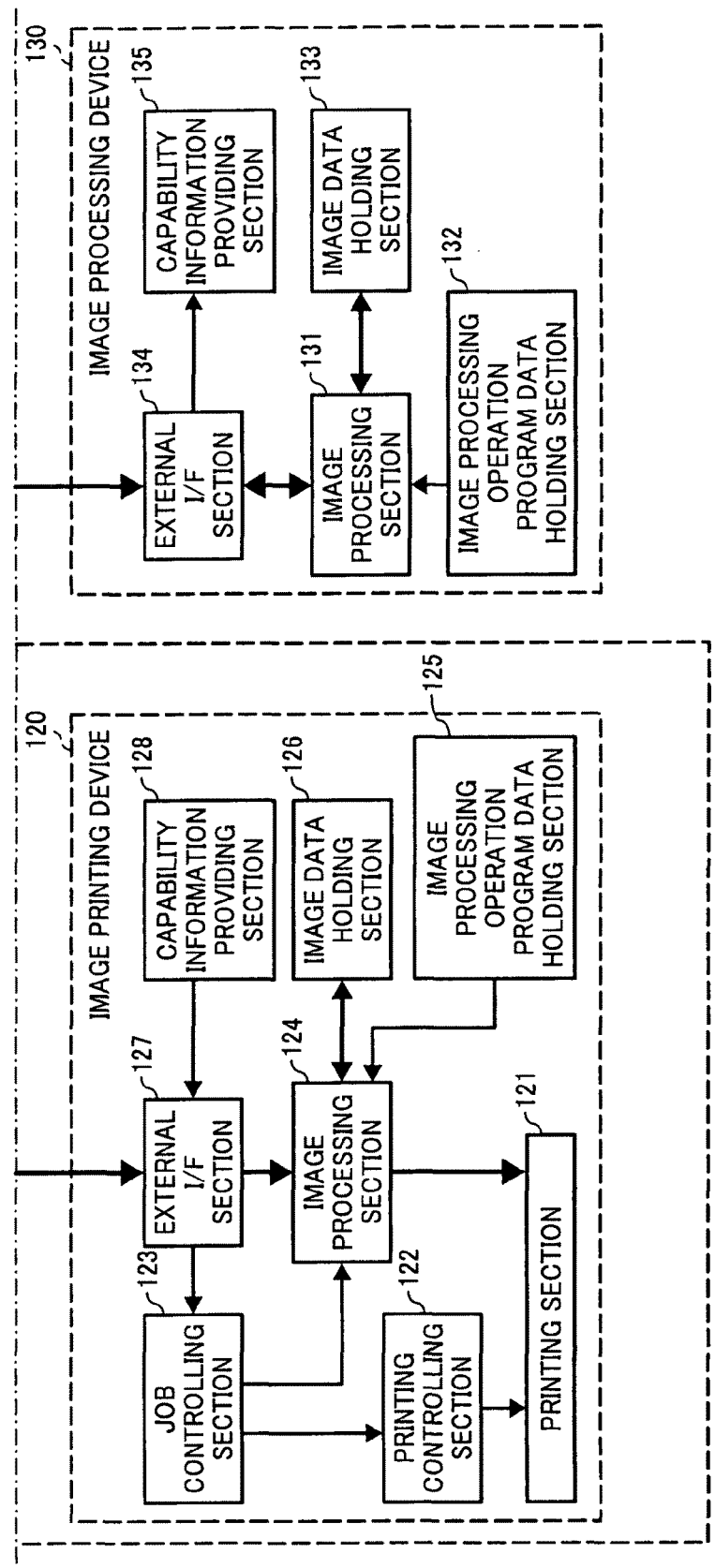
FIG. 11 is a block diagram of an image forming system according to a second embodiment of the present invention.

Next, an image forming system according to a second embodiment of the present invention will be described. Components that are the same as those according to the first embodiment are given the same reference numbers. Explanations thereof may be omitted. FIG. 11 is a block diagram of a configuration of the image forming system according to the second embodiment. In the image forming system, an image processing device 130 is connected to the image forming apparatus 100, via the network 108. The configuration of the image forming apparatus 100 is similar to that according to the first embodiment. However, the image processing operation program data holding section 115 of the image reading device 110 and the image processing operation program data holding section 125 of the image printing device 120 differ. Configurations of the image processing operation program data holding section 115 and the image processing operation program data holding section 125 will be described hereafter.

The image processing device 130 includes an image processing section 131, an image processing operation program data holding section 132, an image data holding section 133, an external I/F section 134, and the capability information providing section 135. The image processing section 131 performs image processing on an image. The image processing operation program data holding section 132 stores therein an image processing operation program run when the image processing section 131 performs image processing, parameters used when the program is run, and the like. Details of the image processing operation program data holding section 132 will be described hereafter. The image data holding section 133 stores therein the image to be processed and image data processed by the image processing section 131. The capability information providing section 135 generates information (capability information) on an image processing operation that can be performed by the image processing section 131, based on the image processing operation program stored in the image processing operation program data holding section 132. The capability information providing section 135 transmits the capability information to the operating unit 101, via the external I/F section 134. The external I/F section 134 controls communication with the image reading device 110, the image printing device 120, and the operating unit 101, performed via the network 108.

Figure 12:
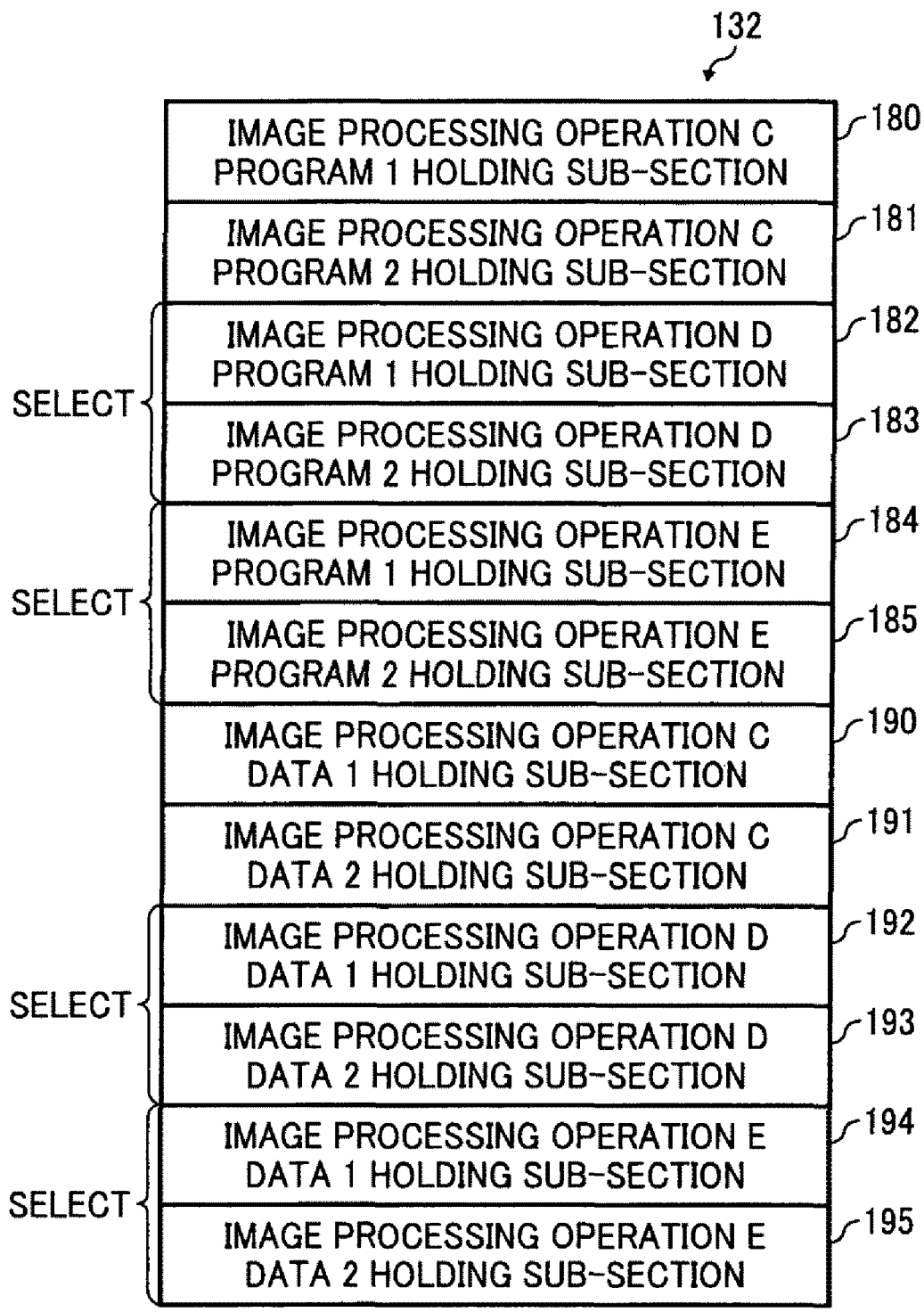
FIG. 12 is a block diagram of an image processing operation program data holding section shown in FIG. 11.

Next, an internal configuration of the image processing operation program data holding section 132 will be described. FIG. 12 is a block diagram of an example of an internal configuration of the image processing operation program data holding section 132. The image processing section 131 of the image processing device 130 can perform the image processing operations C, the image processing operation D, and the image processing operation E, described according to the first embodiment. In a configuration such as this, the image processing operation program data holding section 132 includes an image processing operation C program 1 holding sub-section 180, an image processing operation C program 2 holding sub-section 181, an image processing operation D program 1 holding sub-section 182, an image processing operation D program 2 holding sub-section 183, an image processing operation E program 1 holding sub-section 184, and an image processing operation E program 2 holding sub-section 185. The image processing operation C program 1 holding sub-section 180 stores therein the program C1 run when image rotation within the image processing operations C is performed. The image processing operation C program 2 holding sub-section 181 stores therein the program C2 run when image compositing within the image processing operations C is performed. The image processing operation D program 1 holding sub-section 182 stores therein the program D1 run when the image processing operation D is performed. The image processing operation D program 2 holding sub-section 183 stores therein the program D2 run when the image processing operation D is performed. The image processing operation E program 1 holding sub-section 184 stores therein the program E1 run when the image processing operation E is performed. The image processing operation E program 2 holding sub-section 185 stores therein the program E2 run when the image processing operation E is performed. The image processing operation program data holding section 132 also includes an image processing operation C data 1 holding sub-section 190, an image processing operation C data 2 holding sub-section 191, an image processing operation D data 1 holding sub-section 192, an image processing operation D data 2 holding sub-section 193, an image processing operation E data 1 holding sub-section 194, and an image processing operation E data 2 holding sub-section 195. The image processing operation C data 1 holding sub-section 190 stores therein data such as parameters used when image rotation within the image processing operations C is performed. The image processing operation C data 2 holding sub-section 191 stores therein data such as parameters used when image compositing within the image processing operations C is performed. The image processing operation D data 1 holding sub-section 192 stores therein data such as parameters used when the program D1 run when the image processing operation D is performed is run. The image processing operation D data 2 holding sub-section 193 stores therein data such as parameters used when the program D2 run when the image processing operation D is performed is run. The image processing operation E data 1 holding sub-section 194 stores therein data such as parameters used when the program E1 run when the image processing operation E is performed is run. The image processing operation E data 2 holding sub-section 195 stores therein data such as parameters used when the program E2 run when the image processing operation E is performed is run.

The program D1 or the program D2 of the programs run when the image processing operation D is performed can be selectively run. The program E1 or the program E2 of the programs run when the image processing operation E is performed can also be selectively run. An image processing operation arbitrating section 107 of the operating unit 101, described hereafter, decides the program to be selected.

Figure 13:
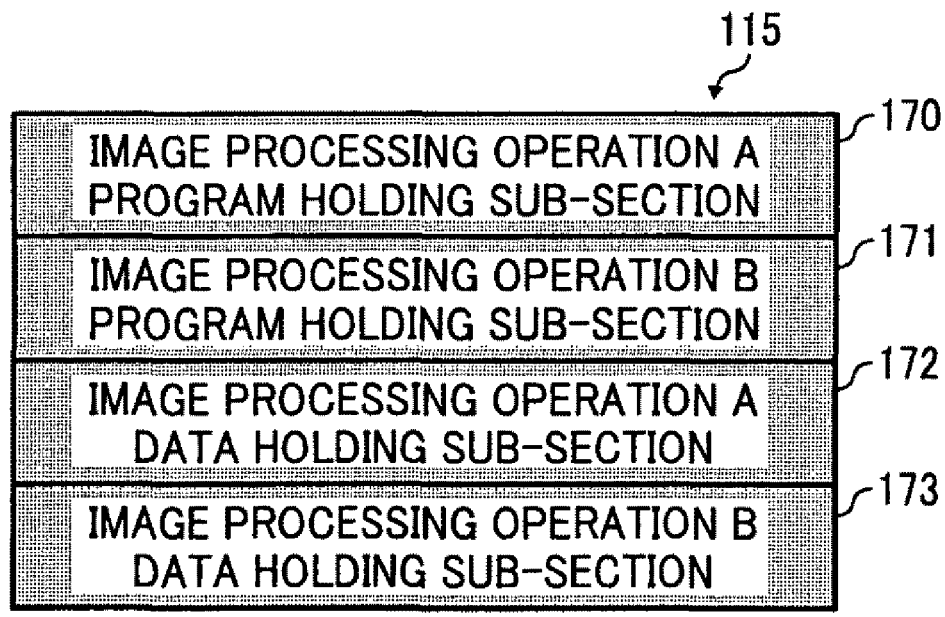
FIG. 13 is a block diagram of an image processing operation program data holding section shown in FIG. 11.

Next, an internal configuration of the image processing operation program data holding section 115 of the image reading device 110 will be described. FIG. 13 is a block diagram of an example of the internal configuration of the image processing operation program data holding section 115. The image processing section 114 of the image reading device 110 can perform the image processing operation A and the image processing operation B, described according to the first embodiment. In a configuration such as this, the image processing operation program data holding section 115 includes an image processing operation A program holding sub-section 170, an image processing operation B program holding sub-section 171, an image processing operation A data holding sub-section 172, and an image processing operation B data holding sub-section 173. The image processing operation A program holding sub-section 170 stores therein a program run when the image processing operation A is performed. The image processing operation B program holding sub-section 171 stores therein a program run when the image processing operation B is performed. The image processing operation A data holding sub-section 172 stores therein data such as parameters used when the image processing operation A is performed. The image processing operation B data holding sub-section 173 stores therein data such as parameters used when the image processing operation B is performed.

Figure 14:
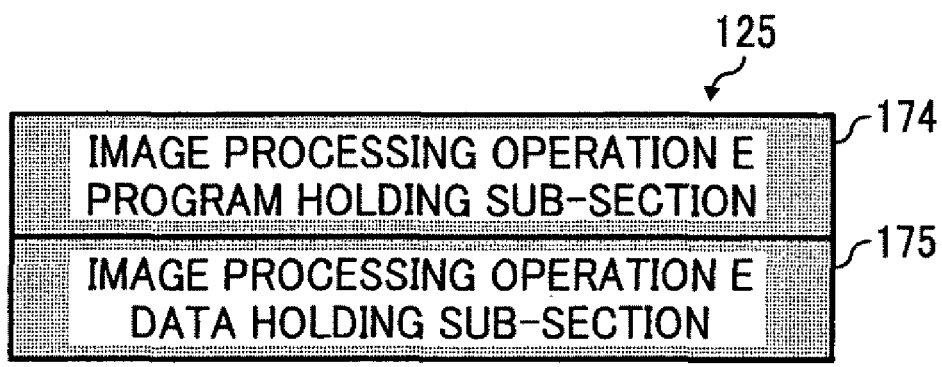
FIG. 14 is a block diagram of an image processing operation program data holding section shown in FIG. 11.

Next, an internal configuration of the image processing operation program data holding section 125 of the image printing device 120 will be described. FIG. 14 is a block diagram of an example of the internal configuration of the image processing operation program data holding section 125. The image processing section 124 of the image printing device 120 can perform the image processing operation E, described according to the first embodiment. In a configuration such as this, the image processing operation program data holding section 125 includes an image processing operation E program holding sub-section 174 and an image processing operation E data holding sub-section 175. The image processing operation E program holding sub-section 174 stores therein a program run when the image processing operation E is performed. The image processing operation E data holding sub-section 175 stores therein data such as parameters used when the image processing operation E is performed.

A configuration of the image processing operation arbitrating section 107 of the operating unit 101 is similar to that according to the first embodiment. However, the image processing operation arbitrating section 107 according to the second embodiment differs from that according to the first embodiment as follows. The image processing operation arbitrating section 107 acquires the capability information from the image processing device 130 as well. The image processing operation arbitrating section 107 decides the image processing flow using the capability information of the image reading device 110, the capability information of the image printing device 120, and the capability information of the image processing device 130.

Figure 15B:
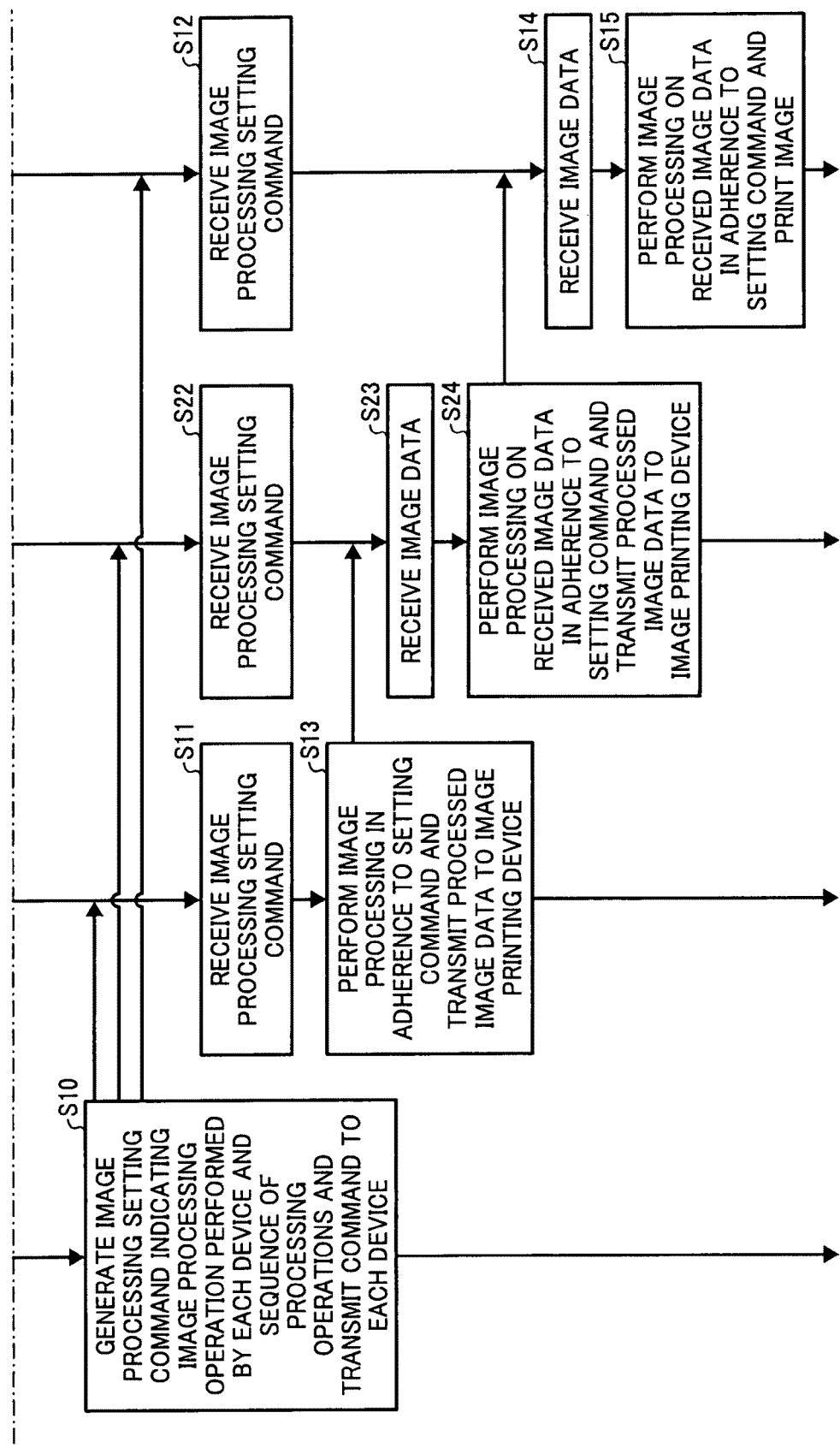
FIG. 15 is a flowchart of procedures in a copy processing operation according to the second embodiment.

Next, the copy processing operation according to the second embodiment will be described. FIG. 15 is a flowchart of the copy processing operation according to the second embodiment. Procedures that differ from those according to the first embodiment will be described in detail. Explanations of procedures that are the same as those according to the first embodiment may be omitted.

At Step S2, the image processing operation arbitrating section 107 of the operating unit 101 transmits the acquisition commands to the image reading device 110 and the image printing device 120. The image processing operation arbitrating section 107 also transmits the acquisition command to the image processing device 130. When the image processing device 130 receives the acquisition command from the operating unit 101 via the external I/F section 134 (Step S20), the capability information providing section 135 generates an XML-format response message including information on the image processing operation that can be performed by the image processing section 131 (capability information), based on the image processing operation program stored in the image processing operation program data holding section 132. FIG. 16 is a diagram of an example of the XML-format response message generated by the capability information providing section 135. The capability information providing section 135 transmits a response message including the capability information, such as that described above, to the operating unit 101 by http communication, via the external I/F section 134 (Step S21). As according to the first embodiment, in the image reading device 110, the capability information providing section 118 transmits the response message including the capability information to the operating unit 101 (Step S5). FIG. 17 is a diagram of an example of the XML-format response message generated by the capability information providing section 118. As according to the first embodiment, in the image printing device 120, the capability information providing section 128 transmits the response message including the capability information to the operating unit 101 (Step S6). FIG. 18 is a diagram of an example of the XML-format response message generated by the capability information providing section 128.

When the image processing operation arbitrating section 107 of the operating unit 101 receives the response message transmitted from the image reading device 110, the response message transmitted from the image printing device 120, and the response message transmitted from the image processing device 130 via the external I/F section 106 (Step S7), the image processing operation arbitrating section 107 stores the capability information included in each response message in the capability table 212 (Step S8). At Step S9, the image processing operation arbitrating section 107 decides the combinations and the sequences of the image processing operations to be performed by the image reading device 110, the image processing operations to be performed by the image printing device 120, and the image processing operations to be performed by the image processing device 130, using the pieces of capability information. At Step S10, the image processing operation arbitrating section 107 generates an XML-format image processing setting command (setting command 3) that is image processing information indicating the image processing operations to be performed by the image reading device 110 and the sequence of the image processing operations. The image processing operation arbitrating section 107 generates an XML-format image processing command (setting command 4) that is image processing information indicating the image processing operations to be performed by the image printing device 120 and the sequence of the image processing operations. The image processing operation arbitrating section 107 also generates an XML-format image processing command (setting command 5) that is image processing information indicating the image processing operations to be performed by the image processing device 130 and the sequence of the image processing operations. FIG. 19 to FIG. 21 are respectively diagrams of examples of the setting command 3, the setting command 4, and the setting command 5 generated by the image processing operation arbitrating section 107. The image processing operation arbitrating section 107 transmits the setting command 3 to the image reading device 110, the setting command 4 to the image printing device 120, and the setting command 5 to the image processing device 130, via the external I/F section 106.

When the image reading device 110 receives the setting command 3 transmitted from the operating unit 101 (Step S11), the image processing section 114 performs an image processing operation in adherence to the setting command 3 on the image read by the reading section 111. The image reading device 110 stores the processed image data in the image data holding section 116. At Step S13, the image reading device 110 transmits the processed image data to the image processing device 130. When the image processing device 130 receives the setting command 5 transmitted from the operating unit 101 (Step S22) and receives the image data from the image reading device 110 (Step S23), the image processing section 131 performs an image processing operation in adherence to the setting command 5 on the image data. The image processing device 130 stores the processed image data in the image data holding section 133. The image processing device 130 transmits the processed image data to the image printing device 120 (Step S24). The image printing device 120 receives setting command 4 transmitted from the operating unit 101 (Step S12). When the image printing device 120 receives the image data from the image processing device 130 (Step S14), the image processing section 124 performs an image processing operation in adherence to the setting command 4 on the image data. The image printing device 120 prints the processed image onto a paper medium (Step S15).

As described above, when the image processing device 130 performs various image processing operations instead of the image printing device 120, the configuration of the image printing device 120 can be simplified. In this case as well, the optimal image processing flow adhering to the input characteristics and the output characteristics can be actualized by the image processing operation arbitrating section 107 deciding the combinations of the image processing operations to be performed by the image reading device 110, the image processing operations to be performed by the image printing device 120, and the image processing operations to be performed by the image processing device 130 and the sequences of the image processing operations using the capability information of the image reading device 110, the capability information of the image printing device 120, and the capability information of the image processing device 130.

Figure 22B:
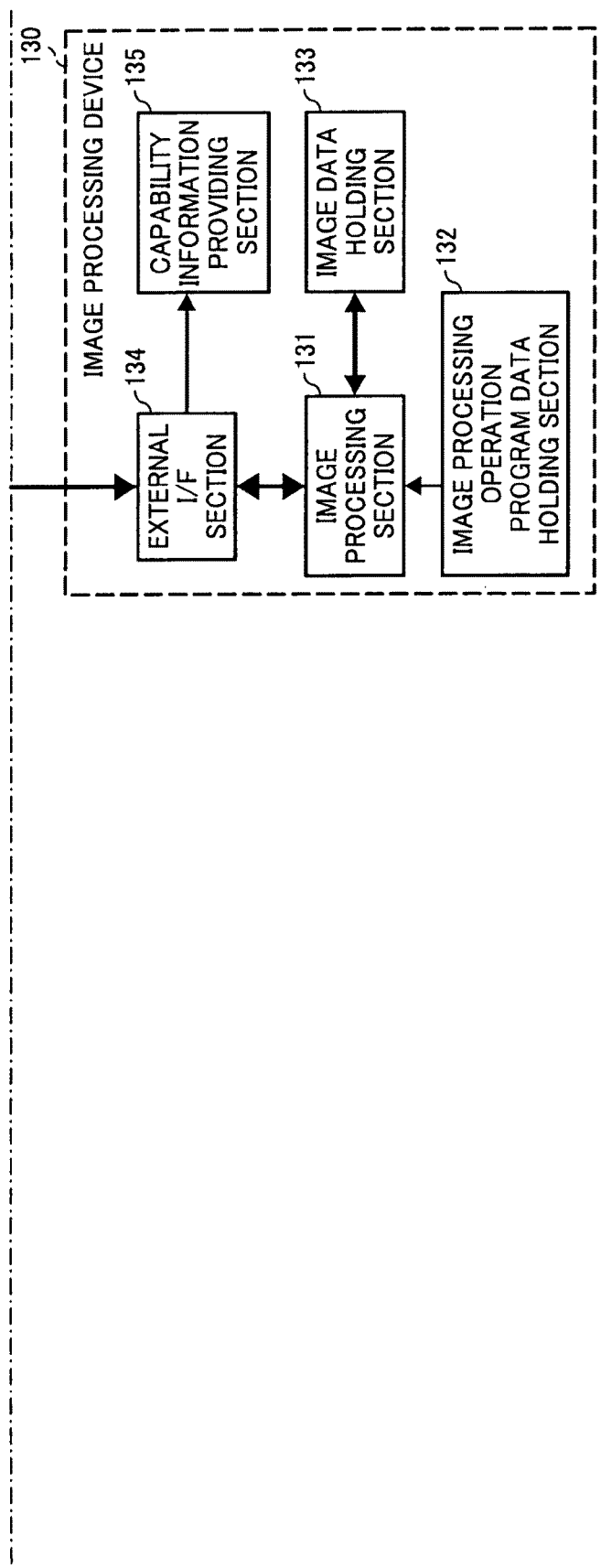
FIG. 22 is a block diagram of an image forming system according to a third embodiment of the present invention.

Next, an image forming system according to a third embodiment of the present invention will be described. Components that are the same as those according to the first embodiment and the second embodiment are given the same reference numbers. Explanations thereof may be omitted. FIG. 22 is a diagram of a configuration of the image forming system according to the third embodiment. In the image forming system according to the third embodiment, an image reading and printing device 140 is provided instead of the image reading device 110 and the image printing device 120. The image reading and printing device 140 is multifunctional, having an image reading function for reading an image and an image printing function for printing an image. A configuration of the image processing device 130 is similar to that according to the second embodiment.

The image reading and printing device 140 includes a reading section 141, a reading controlling section 141A, a printing section 142, a printing controlling section 142A, a job-controlling section 143, an image processing section 145, an image processing operation program data holding section 146, an image data holding section 147, an external I/F section 148, and a capability information providing section 149. These sections are connected by a communication path. Configurations of the reading section 141 and the reading controlling section 141A are similar to the configurations of the reading section 111 and the reading controlling section 112 according to the first embodiment, described above. Configurations of the printing section 142 and the printing controlling section 142A are similar to the configurations of the printing section 121 and the printing controlling section 122 according to the first embodiment, described above. The job controlling section 143 respectively manages reading of an image performed by the reading section 141 and printing performed by the printing section 142 as a job and controls the jobs. The image processing section 145 performs image processing on the image read by the reading section 141. The image processing operation program data holding section 146 stores therein an image processing operation program run when the image processing section 145 performs image processing, parameters used when the program is run, and the like. Details of the image processing operation program data holding section 146 will be described hereafter. The image data holding section 147 stores therein the image read by the reading section 141 and image data processed by the image processing section 145. The capability information providing section 149 generates information (referred to, hereinafter, as capability information) on an image processing operation that can be performed by the image processing section 145, based on the image processing operation program stored in the image processing operation program data holding section 146. The capability information providing section 149 transmits the capability information to the operating unit 101, via the external I/F section 148. The external I/F section 148 controls communication with the image processing device 130 and the operating unit 101 performed via the network 108.

Figure 23:
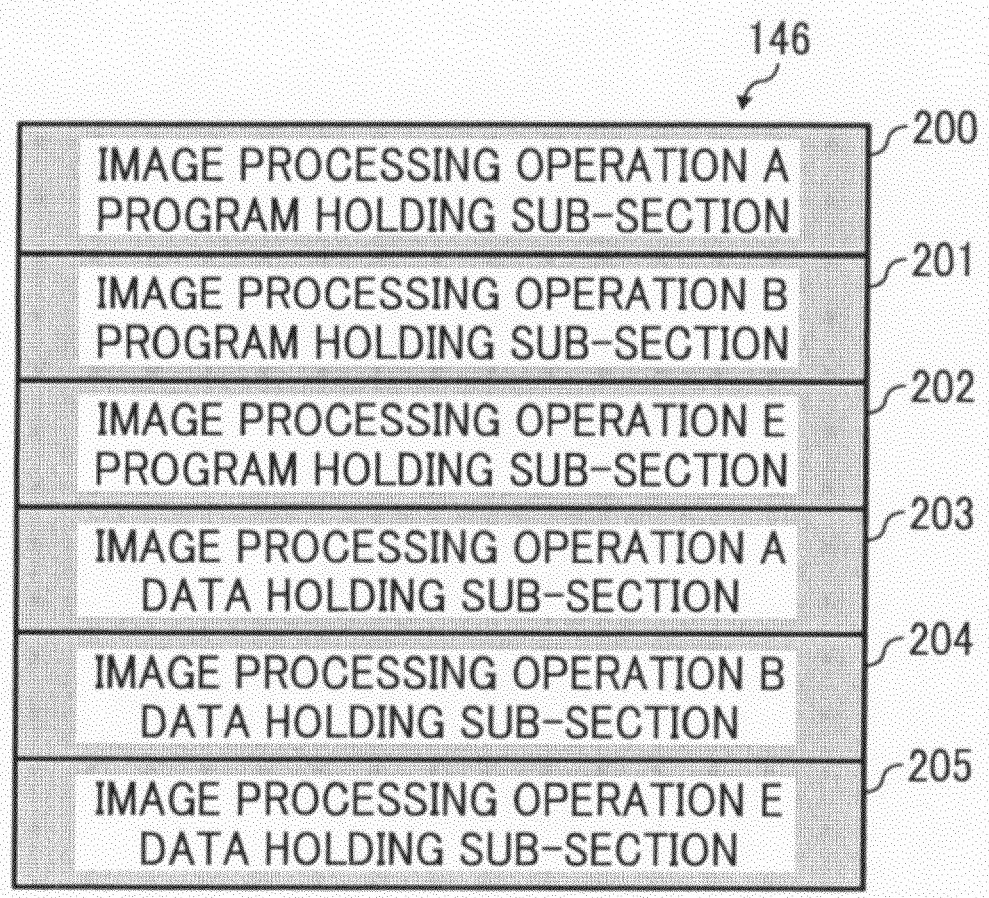
FIG. 23 is a block diagram of an image processing operation program data holding section shown in FIG. 22.

Next, an internal configuration of the image processing operation program data holding section 146 will be described. FIG. 23 is a diagram of an example of the internal configuration of the image processing operation program data holding section 146. The image processing section 145 of the image reading and printing device 140 can perform the image processing operation A, the image processing operation B, and the image processing operation E, described according to the first embodiment. In a configuration such as this, the image processing operation program data holding section 146 includes an image processing operation A program holding sub-section 200, an image processing operation B program holding sub-section 201, and an image processing operation E program holding sub-section 202. The image processing operation A program holding sub-section 200 stores therein the program run the image processing operation A is performed. The image processing operation B program holding sub-section 201 stores therein the program run when the image processing operation B is performed. The image processing operation E program holding sub-section 202 stores therein the program run when the image processing operation E is performed. The image processing operation program data holding section 146 also includes an image processing operation A data holding sub-section 203, an image processing operation B data holding sub-section 204, and an image processing operation E data holding sub-section 205. The image processing operation A data holding sub-section 203 stores therein data such as parameters used when the image processing operation A is performed. The image processing operation B data holding sub-section 204 stores therein data such as parameters used when the image processing operation B is performed. The image processing operation E data holding sub-section 205 stores therein data such as parameters used when the image processing operation E is performed.

Figure 24:
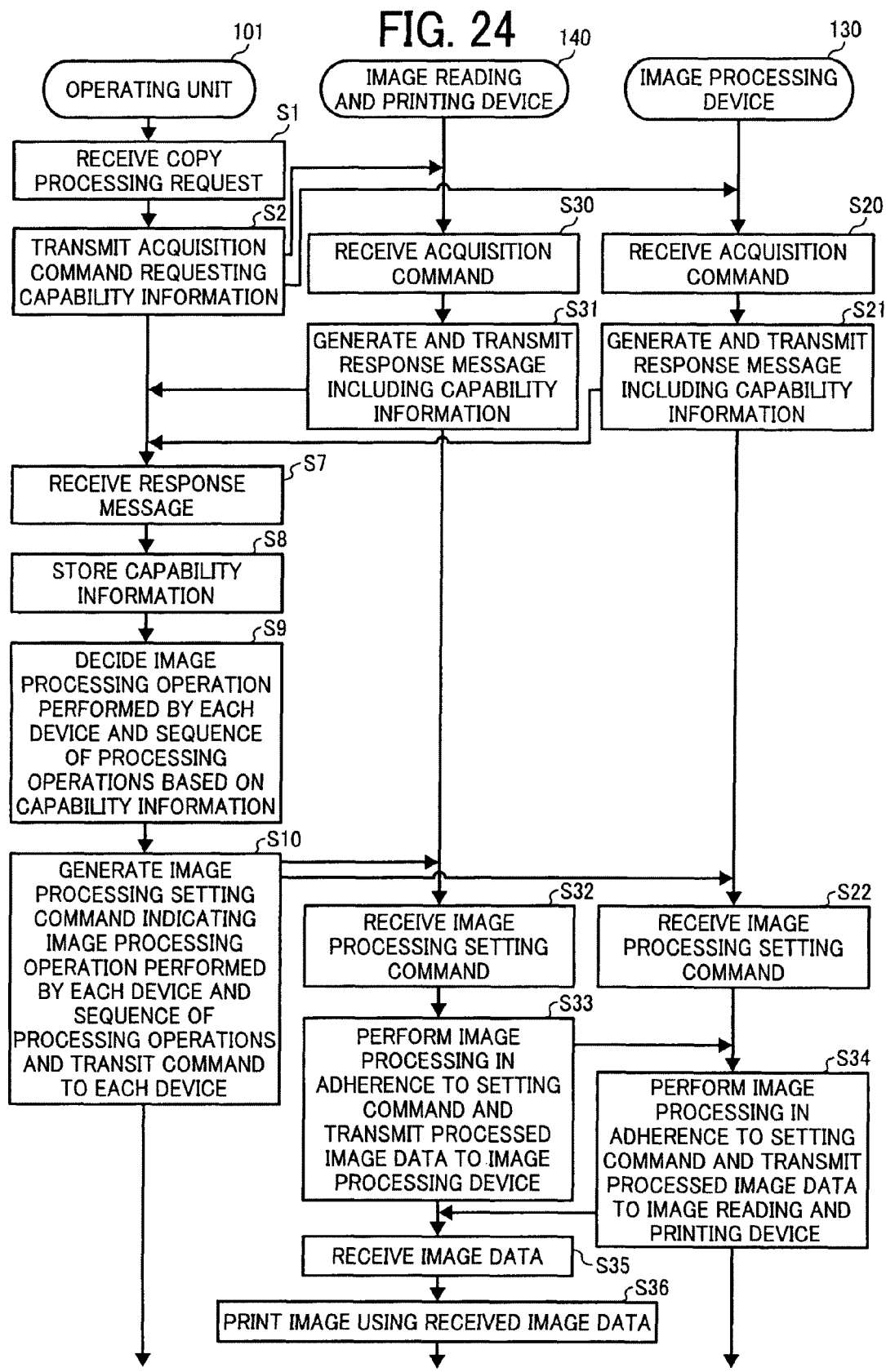
FIG. 24 is a flowchart of procedures in a copy processing operation according to the third embodiment.

Next, the copy processing operation according to the third embodiment will be described. FIG. 24 is a flowchart of the copy processing operation according to the third embodiment. Procedures that differ from those according to the first embodiment and second embodiment will be described in detail. Explanations of procedures that are the same as those according to the first embodiment and the second embodiment may be omitted.

At Step S2, the image processing operation arbitrating section 107 of the operating unit 101 transmits the acquisition commands to the image reading and printing device 140 and the image processing device 130. When the image reading and printing device 140 receives the acquisition command from the operating unit 101 via the external I/F section 148 (Step S30), the capability information providing section 149 generates an XML-format response message including information on the image processing operation that can be performed by the image processing section 145 (capability information), based on the image processing operation program stored in the image processing operation program data holding section 146. FIG. 16 is a diagram of an example of the XML-format response message generated by the capability information providing section 149. The capability information providing section 149 transmits a response message such as that described above to the operating unit 101 by http communication, via the external I/F section 148. As according to the second embodiment, the image processing device 130 generates an XML-format response message including the capability information and transmits the response message to the operating unit 101 by http communication, via the external I/F section 134 (Step S31).

At Step S7, when the image processing operation arbitrating section 107 of the operating unit 101 receives the response message transmitted from the image reading and printing device 140 and the response message transmitted from the image processing device 130 via the external I/F section 106, the image processing operation arbitrating section 107 stores the capability information included in each response message in the capability table 212 (Step S8). At Step S9, the image processing operation arbitrating section 107 decides the combinations and the sequences of the image processing operations to be performed by the image reading and printing device 140 and the image processing operations to be performed by the image processing device 130, using the pieces of capability information. At Step S10, the image processing operation arbitrating section 107 generates an XML-format image processing setting command (setting command 6) that is image processing information indicating the image processing operations to be performed by the image reading and printing device 140 and the sequence of the image processing operations. The image processing operation arbitrating section 107 also generates an XML-format image processing setting command (setting command 7) that is image processing information indicating the image processing operations to be performed by the image processing device 130 and the sequence of the image processing operations. FIG. 26 is a diagram of an example of the setting command 6 generated by the image processing operation arbitrating section 107. The setting command 7 is similar to that shown in FIG. 21, described above. The image processing operation arbitrating section 107 transmits the setting command 6 to the image reading and printing device 140 and the setting command 7 to the image processing device 130.

When the image reading and printing device 140 receives the setting command 6 transmitted from the operating unit 101 (Step S32), at Step S33, the image processing section 145 performs image processing in adherence to the setting command 6 on the image read by the reading section 141. The image processing section 145 stores the processed image data in the image data holding section 147. The image reading and printing device 140 transmits the processed image data to the image processing device 130 (Step S33). When the image processing device 130 receives the setting command 7 transmitted from the operating unit 101 (Step S22) and receives the image data transmitted from the image reading and printing device 140, the image processing section 131 performs image processing in adherence to the setting command 7 on the received image data. The image processing section 131 stores the processed image data in the image data holding section 133. The image processing device 130 transmits the processed image data to the image reading and printing device 140 (Step S34). When the image reading and printing device 140 receives the image data transmitted from the image processing device 130 (Step S35), the image reading and printing device 140 prints an image onto a paper medium using the image data (Step S36).

As described above, the image forming system includes the multifunctional image reading and printing device 140 having the image reading function and the image printing function and the image processing device 130 that can perform various image processing operations. In this case as well, the optimal image processing flow adhering to the input characteristics and the output characteristics can be actualized by the image processing operation arbitrating section 107 deciding the combinations of the image processing operations to be performed by the image reading and printing device 140 and the image processing operations to be performed by the image processing device 130 and the sequence of the image processing operations, using the capability information of the image reading and printing device 140 and the capability information of the image processing device 130.

Figure 27B:
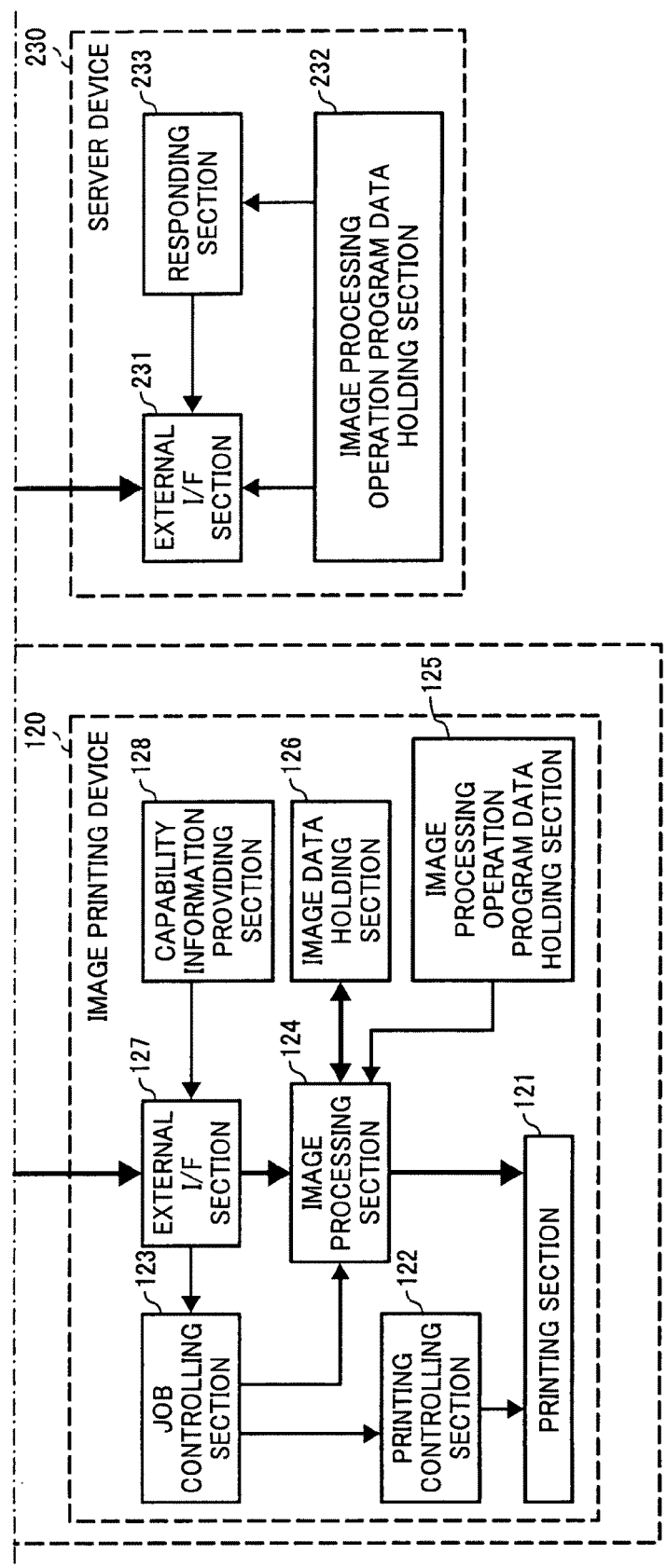
FIG. 27 is a block diagram of an image forming system according to a fourth embodiment of the present invention.

Next, an image forming system according to a fourth embodiment of the present will be described. Components that are the same as those according to the first embodiment are given the same reference numbers. Explanations thereof may be omitted. FIG. 27 is a diagram of a configuration of the image forming system according to the fourth embodiment. In the image forming system according to the fourth embodiment, a server device 230 is connected to the image forming apparatus 100 via the network 108. A configuration of the image forming apparatus 100 is similar to that according to the first embodiment. However, internal configurations of the image processing operation program data holding section 115 of the image reading device 110 and the image processing operation program data holding section 125 of the image printing device 120 differ. Information serving as the capability information differs from that according to the first embodiment. According to the fourth embodiment, the image processing section 114 of the image reading device 110 and the image processing section 124 of the image printing device 120 are associated in advance with the processor ID identifying each section.

<Internal Configuration of the Image Processing Operation Program Data Holding Section 115 of the Image Reading Device 110>

An internal configuration of the image processing operation program data holding section 115 of the image reading device 110 will be described. FIG. 28 is a block diagram of an example of the internal configuration of the image processing operation program data holding section 115. As according to the first embodiment, the image processing operation program data holding section 115 includes the image processing operation A program holding sub-section 150, the image processing operation B program holding sub-section 151, the image processing operation C program 1 holding sub-section 152, the image processing operation C program 2 holding sub-section 153, the image processing operation A data holding sub-section 154, the image processing operation B data holding sub-section 155, the image processing operation C data 1 holding sub-section 156, and the image processing operation C data 2 holding sub-section 157. A uniform resource locator (URL) is associated with each program or data stored in each holding sub-section as respective storing locations of the programs and data within the server device 230. The associated URLs are stored within the sub-sections. The storing locations of the programs and data are within the server device 230. The image reading device 110 can download each program or each piece of data from the server device 230 using the URL.

Next, an internal configuration of the image processing operation program data holding section 125 of the image printing device 120 will be described. FIG. 29 is a block diagram of an example of the internal configuration of the image processing operation program data holding section 125. As according to the first embodiment, the image processing operation program data holding section 125 includes the image processing operation D program 1 holding sub-section 160, the image processing operation D program 2 holding sub-section 161, the image processing operation E program 1 holding sub-section 162, the image processing operation E program 2 holding sub-section 163, the image processing operation D data 1 holding sub-section 164, the image processing operation D data 2 holding sub-section 165, the image processing operation E data 1 holding sub-section 166, and the image processing operation E data 2 holding sub-section 167. A URL is associated with each program or data stored in each holding sub-section as respective storing locations of the programs and data within the server device 230. The associated URL are stored within the sub-sections. The storing locations of the programs and data are within the server device 230. The image printing device 120 can download each program or each piece of data from the server device 230 using the URL.

Figure 30:
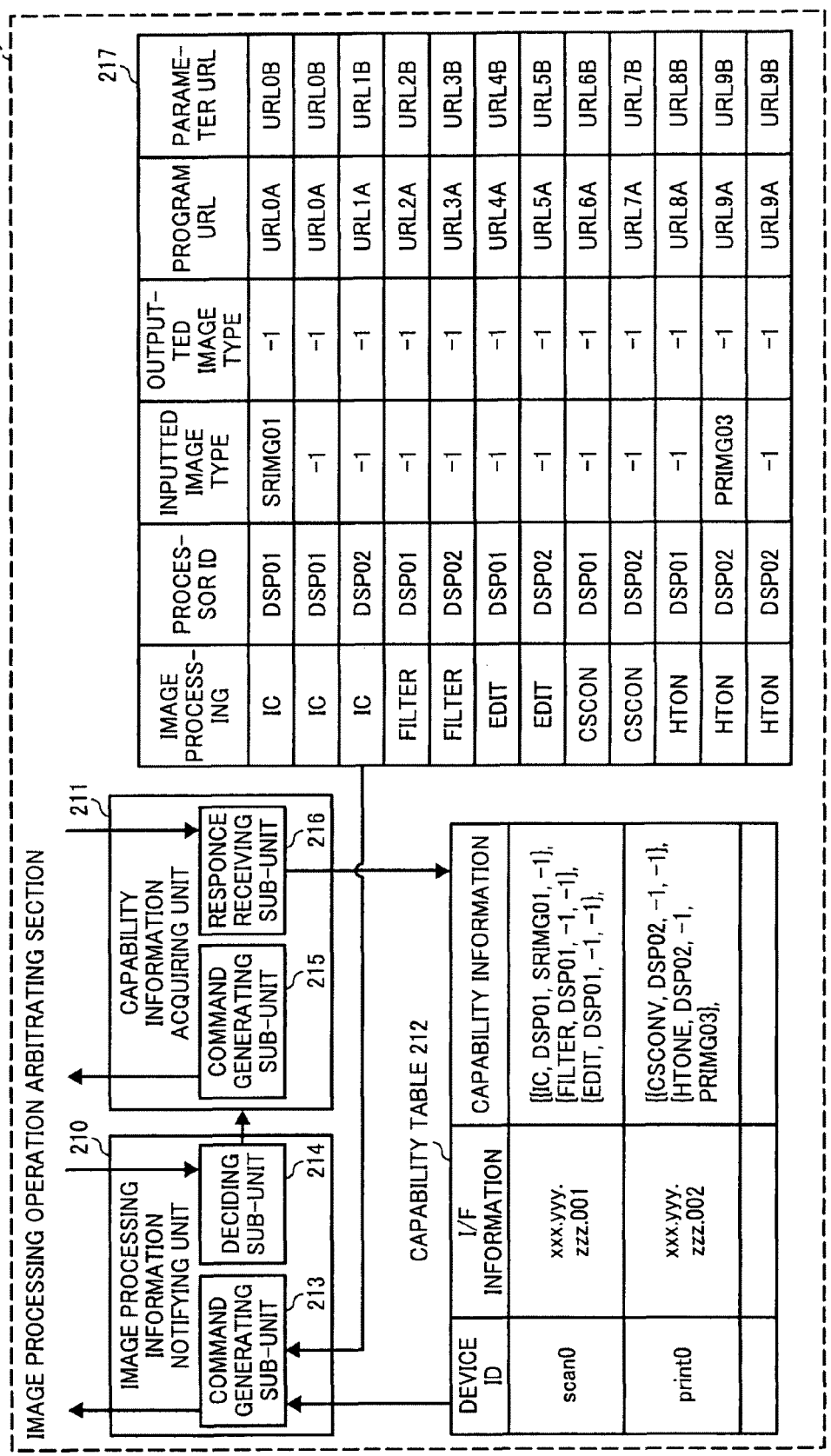
FIG. 30 is a block diagram of the image processing operation arbitrating section shown in FIG. 27.

Next, a configuration of the image processing operation arbitrating section 107 of the operating unit 101 will be described. FIG. 30 is an example of a configuration of the image processing operation arbitrating section 107. According to the fourth embodiment, information stored in the capability table 212 of the image processing operation arbitrating section 107 differs from that according to the first embodiment. In the capability table 212 in FIG. 20, the device ID of the image reading device 110 and the image printing device 120 identifying each device, the I/F information related to the interface connecting each device, and the capability information are associated. The IP address is used as the I/F information. The capability information includes the processing operation ID of the image processing operation, a processor ID identifying the image processing section performing the image processing operation, the input image type, and the output image type. In FIG. 30, each element is arrayed in sequence from left to right for each image processing operation. '−1' indicated as the input image type and the output image type indicates that the image type is not specified.

The image processing operation arbitrating section 107 further includes a URL table 217. As shown in FIG. 30, the URL table 217 includes the processing operation ID of the image processing, the processor ID identifying the image processing section performing the image processing operation, the input image type, the output image type, and the URL indicating respective storing locations of the program run when the image processing operation is performed and parameters used.

The image processing information notifying unit 210 including the image processing operation arbitrating section 107 uses the pieces of capability information stored in the capability table 212 and decides the image processing operation to be performed by the image reading device 110 and the image processing operation to be performed by the image printing device 120. The image processing information notifying unit 210 references the URL table 217 and generates an XML-format image processing setting command including the respective URL of the program run when the image processing operation of a decided combination of image processing operations is performed and the data used when the image processing operation is performed. The image processing information notifying unit 210 transmits the setting commands to the image reading device 110 and the image printing device 120.

The server device 230 includes an external I/F section 231, an image processing operation program data holding section 232, and a responding section 233. The image processing operation program data holding section 232 stores therein programs run when various kinds of image processing operations are performed and data such as parameters used when the image processing operations are performed. The image processing operation program data holding section 232 associates the respective URL of the programs and data with the programs and data and stores therein the associated URL. The image processing operation program data holding section 232 at least stores therein each program run when the image processing operation A, the image processing operation B, the image processing operation C, the image processing operation D, and the image processing operation E, described according to the first embodiment, are performed as the image processing operation and the pieces of data used when the programs run. When the URL of the program or data is designated by the image reading device 110 or the image printing device 120, the responding section 233 reads the program or data from the image processing operation program data holding section 232 and transmits the read program or data to the image reading device 110 or the image printing device 120, via the external I/F section 231. The external I/F section 231 controls communication with the image reading device 110, the image printing device 120, and the operating unit 101 performed via the network 108.

Next, the copy processing operation according to the fourth embodiment will be described. The copy processing operation according to the fourth embodiment is similar to those shown in FIG. 5 so that a diagram thereof is omitted. Procedures differing from those according to the first embodiment will be described in detail.

At Step S5, the capability information providing section 118 of the image reading device 110 generates the response message. However, the capability information included in the response message differs from that according to the first embodiment. FIG. 31 is a diagram of an example of the response message generated by the capability information providing section 118. Each piece of capability information includes the processing operation ID <ID> for identifying the image processing operation, the input image type <inputDataType>, the processor ID <processorID> identifying the image processing section 114 of the image reading device 110, and the output image type <outputDataType>.

Similarly, the capability information included in the response message generated by the capability information providing section 128 of the image printing device 120 at Step S6 differs from that according to the first embodiment. FIG. 32 is a diagram of an example of the response message generated by the capability information providing section 128. Each piece of capability information includes the processing operation ID <ID> for identifying the image processing operation, the input image type <inputDataType>, the processor ID <processorID> identifying the image processing section 124 of the image printing device 120, and the output image type <outputDataType>.

At Step S7, when the response message transmitted from the image reading device 110 and the response message transmitted from the image printing device 120 are received via the external I/F section 106, the image processing operation arbitrating section 107 of the operating unit 101 stores the capability information included in each response message in the capability table 212 (Step S8). Using the pieces of capability information, the image processing operation arbitrating section 107 decides the combination and the sequence of the image processing operations to be performed by the image reading device 110 and the image processing operations to be performed by the image printing device 120 (Step S9). Specifically, the combination and the sequence of the image processing operations in which the output image type and the input image type match is determined for each image processing operation indicated in respective pieces of capability information. The image processing operation arbitrating section 107 decides the determined combination and sequence to be an optimal image processing flow. The image processing operation arbitrating section 107 generates an XML-format image processing setting command (setting command 8) including the URL of the program run when the image processing operation within the combination of image processing operations to be performed by the image reading device 110 is performed and the data used when the image processing operation is performed, with reference to the URL table 217. The image processing operation arbitrating section 107 also generates an XML-format image processing setting command (setting command 9) including the URL of the program run when the image processing operation to be performed by the image printing device 120 is performed and the data used when the image processing operation is performed (Step S10). FIG. 33 is a diagram of an example of the setting command 8 generated by the image processing operation arbitrating section 107. Regarding the image processing operations to be performed by the image reading device 110, the processing operation ID <ID> of the image processing operation is shown in rows between <imageProcess> and </imageProcess> for each sequence. Specifically, a processing operation ID 'icollect' of the image processing operation A and a processing ID 'filter002' of the image processing operation B are indicated as the image processing operations to be performed by the image reading device 110. The storing locations of the programs run when each image processing operation is performed are respectively indicated in a <programUrl> row. The storing locations of the pieces of data used when the programs are run are respectively indicated in <paramUrl>. FIG. 34 is a diagram of an example of the setting command 9 generated by the image processing operation arbitrating section 107. As in FIG. 33, regarding the image processing operations to be performed by the image printing device 120, the processing operation ID <ID> of the image processing operation is shown in rows between <imageProcess> and </imageProcess> for each sequence. Specifically, a processing operation ID 'csconv' of the image processing operation D and a processing ID 'htone' of the image processing operation E are indicated as the image processing operations to be performed by the image printing device 120. The storing locations of the programs run when each image processing operation is performed are respectively indicated in a <programUrl> row. The storing locations of the pieces of data used when the programs are run are respectively indicated in <paramUrl>. The image processing operation arbitrating section 107 transmits the setting command 8 to the image reading device 110 and the setting command 9 to the image printing device 120, via the external I/F section 106.

When the image reading device 110 receives the setting command 8 transmitted from the operating unit 101 (Step S11), at Step S13, the image reading device 110 processes the program run when each image processing operation (the image processing operation A and the image processing operation B, herein) specified in the setting command 8 is performed and the data used when the program is run as follows. The image reading device 110 compares each URL specified in the setting command 8 for each program run when the image processing operation A and the image processing operation B are performed and each piece of data used when the programs are run with each URL associated with each program respectively stored in the image processing operation A program holding sub-section 150 and the image processing operation B program holding sub-section 151 and each piece of data respectively stored in the image processing operation A data holding sub-section 154 and the image processing operation B data holding sub-section 155 of the image processing operation program data holding section 115. When a program or a piece of data of which the URL specified in the setting command 8 and the associated URL in the image processing operation program data holding section 115 do not match is present, the image reading device 110 judges that the program or the piece of data is required to be downloaded. The image reading device 110 uses the URL specified in the setting command 8 and accesses the server device 230. The image reading device 110 downloads the program or the piece of data and stores the program or data in the corresponding holding sub-section within the image processing operation program data holding section 115. When the URL specified in the setting command 8 and the associated URL in the image processing operation program data holding section 115 of the program or the piece of data match, the image reading device 110 judges that downloading is not necessary. The image processing section 114 performs the image processing operation A and the image processing operation B on the image read by the reading section 111, using the program and data stored in the image processing operation program data holding section 115. The image data holding section 116 stores the processed image data. The image reading device 110 transmits the processed image data to the image printing device 120, via the external I/F section 117.

When the image processing operations C are specified in the setting command 8 transmitted from the operating unit 101, the image reading device 110 compares each URL specified in the setting command 8 for the programs run when the image processing operations C are performed and each URL associated with the programs stored in the image processing operations C program 1 holding sub-section 152 and image processing operations C program 2 holding sub-section 153. When the URL specified in the setting command 8 and the URL associated with the program stored in either one of the holding sub-sections match, the image processing operation C is performed using the program. When the URL specified in the setting command 8 for the program run when the image processing operation C is performed does not match the URL associated with the program in either holding sub-section, the image reading device 110 downloads the program using the URL specified in the setting command 8. The same applies to the data used when the image processing operation C is performed. When each URL specified in the setting command 8 and each URL associated with the pieces of data stored in the image processing operations C data 1 holding sub-section 156 and image processing operations C data 2 holding sub-section 157 do not match, the data is downloaded.

At the same time, when the image printing device 120 receives the setting command 9 transmitted from the operating unit 101 (Step S12) and receives the image data transmitted from the image reading device 110 (Step S14), at Step S15, the image printing device 120 processes the program run when each image processing operation (the image processing operation D and the image processing operation E, herein) specified in the setting command 9 is performed and the data used when the program is run as follows. As does the image reading device 110, the image printing device 120 compares each URL specified in the setting command 9 for each program run when the image processing operation D and the image processing operation E are performed and each piece of data used when the programs are run with each URL associated with each program and each piece of data respectively stored in the image processing operation D program 1 holding sub-section 160, the image processing operation D program 2 holding sub-section 161, the image processing operation E program 1 holding sub-section 162, the image processing operation E program 2 holding sub-section 163, the image processing operation D data 1 holding sub-section 164, the image processing operation D data 2 holding sub-section 165, the image processing operation E data 1 holding sub-section 166, and the image processing operation E data 2 holding sub-section 167. When a program or a piece of data of which the URL specified in the setting command 9 and the associated URL in the holding sub-sections do not match is present, the image printing device 120 uses the URL specified in the setting command 9 and accesses the server device 230. The image reading device 110 downloads the program or the piece of data and stores the program or data in the corresponding holding sub-section within the image processing operation program data holding section 125. The image processing section 124 performs the image processing operation D and the image processing operation E on the image data transmitted from the image reading device 110, using the program and data stored in the image processing operation program data holding section 125. The image printing device 120 prints the processed image onto a paper medium.

According to a configuration such as that described above, the image reading device 110 and the image printing device 120 can download the program and data used to perform image processing from the server device 230 as required. Therefore, the image processing operation can be performed using a more suitable program. An optical image processing flow adhering to the input characteristics and the output characteristics can be actualized.

In an image forming apparatus according to an aspect of the present invention including an image reading unit and an image printing unit that respectively include an image processing section, an optical image processing flow adhering to the characteristics of the image reading unit and the characteristics of the image printing unit can be actualized by an image processing operation that can be performed by the image reading unit and an image processing operation that can be performed by the image printing unit being decided using image processing operation capability information.

In the above aspect, optimal program and data for performing the image processing operation can be used by at least one of a program used to perform the image processing operation or a piece of data used to run the program being acquired from a server device.

Moreover, even when the image forming apparatus is configured with various combinations of a reading section, a printing section, and the image processing section, a combination of image processing operations to be performed by various image processing sections and a sequence of the image processing operations can be decided using the image processing operation capability information on the image processing operations that can be performed by the various image processing sections. The optimal image processing flow can be actualized.

Furthermore, image processing operation specifying information including identifying information identifying at least one of the program run to perform the image processing operation or the piece of data used to run the program is transmitted to the image reading unit and the image printing unit. As a result, the image reading unit and the image printing unit can acquire the optimal program for performing the image processing operation or the piece of data used when the program is run from the server device, using the identifying information. Therefore, for example, latest programs and pieces of data supporting upgrades and the like can be acquired. Optimal processing can be performed for each image processing operation. For example, an image forming apparatus including a combination of an image reading unit and an image printing unit from different manufacturers can be flexibly supported.

Moreover, a controlling section transmits the image processing operation specifying information to the image reading unit and the image printing unit. The image processing operation specifying-information includes input and output specifying information specifying an input image type of an image that can be supported as an input for the image processing operation and an output image type of an image obtained as a result of the image processing operation. As a result, the image reading unit and the image printing unit can perform the image processing operation in adherence to the input image type and the output image type of the image processing operation. Therefore, for example, the latest programs and pieces of data supporting upgrades and the like can be acquired. Optimal processing can be performed for each image processing operation. For example, an image forming apparatus including a combination of an image reading unit and an image printing unit from different manufacturers can be flexibly supported.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   an image reading unit including a reading section that reads an image recorded on a paper medium;
   a first image processing section that is able to perform one or more image processing operations from among a set of first image processing operations on the image read by the reading section to obtain a first processed image; and
   a first generating section that generates first image processing operation capability information indicative of the set of first image processing operations that the first image processing section is able to perform on an image;
   an image printing unit including
      a second image processing section that performs one or more image processing operations from a set of second image processing operations on the first processed image to obtain a second processed image;
      a printing section that prints the second processed image; and
      a second generating section that generates second image processing operation capability information indicative of the set of second image processing operations that the second image processing section is able to perform on an image;
   an operating unit that receives an operation input from a user; and
   a controlling unit including an acquiring section that, when the operating unit receives an operation input instructing printing, acquires the first image processing operation capability information from the first generating section and the second image processing operation capability information from the second generating section;
      a deciding section that decides which image processing operation is to be performed by each of the first image processing section and the second image processing section based on the first image processing operation capability information and the second image processing operation capability information acquired by the acquiring section; and
      a notifying section that generates image processing operation specifying information indicative of the image processing operations decided by the deciding section and transmits the image processing operation specifying information to the image reading unit and the image printing unit.

2. The image forming apparatus according to claim 1, wherein
   the first image processing section performs an image processing operation specified in the image processing operation specifying information on the image read by the reading section; and
   the second image processing section performs an image processing operation specified in the image processing operation specifying information on the first processed image to obtain the second processed image.

3. The image forming apparatus according to claim 1, wherein
the first image processing operation capability information and the second image processing operation capability information include an input image type indicative of types of image that can be input and an output image type indicative type of images that can be output, and
the deciding section selects an image processing operation among the set of first image processing operations of which the output image type matches and an image processing operation among image processing operations that can be performed by the second image processing section of which the input image type matches using the first image processing operation capability information and the second image processing operation capability information acquired by the acquiring section, and decides an image processing operation to be performed by the first image processing section and an image processing operation to be performed by the second image processing section.

4. The image forming apparatus according to claim 1, wherein at least two among the image reading unit, the image printing unit, the operating unit, and the controlling unit are connected to a common network.

5. The image forming apparatus according to claim 1, wherein the notifying section generates the image processing operation specifying information including identifying information indicative of at least one of a computer program used to perform the image processing operation decided by the deciding section and data required to run the computer program.

6. The image forming apparatus according to claim 5, wherein
the notifying section generates an image processing operation specifying information including storing location information indicating a storing location within a server device of at least one of the computer program and the data as the identifying information, and transmits the image processing operation specifying information to the image reading unit,
the image reading unit includes a first processing acquiring section that acquires at least one of the computer program and the data specified by the storing location information included in the image processing operation specifying information, and
the first image processing section performs the image processing operation on the image by using at least one of the computer program and the data.

7. The image forming apparatus according to claim 6, wherein
the image reading unit includes a first storing section stores therein at least one of the computer program and the data and first storing location information indicating a storing location within the server device of at least one of the computer program and the data in associated manner, and
the first processing acquiring section compares the storing location information included in the image processing operation specifying information with the first storing location information stored in the first storing section and acquires at least one of the computer program and the data from the server device based on a result of the comparison.

8. The image forming apparatus according to claim 7, wherein at least one of the image reading unit and the controlling unit is connected to a network to which the server device is connected.

9. The image forming apparatus according to claim 5, wherein
the notifying section generates an image processing operation specifying information including storing location information indicating a storing location within a server device of at least one of the computer program and the data as the identifying information, and transmits the image processing operation specifying information to the image printing unit,
the second image processing section includes a second processing acquiring section that acquires at least one of the computer program and the data from the server device, using the storing location information included in the image processing operation specifying information, and
the second image processing section performs the image processing operation on the image by using at least one of the computer program and the data acquired by the second processing acquiring section.

10. The image forming apparatus according to claim 9, wherein
the image printing unit includes a second storing section that stores therein at least one of the computer program and the data and second storing location information indicating a storing location within the server device of at least one of the computer program and the data in associated manner, and
the second processing acquiring section compares the storing location information included in the image processing operation specifying information with the second storing location information stored in the second storing section and acquires at least one of the computer program and the data from the server device based on a result of the comparison.

11. The image forming apparatus according to claim 9, wherein the server device is connected to a network to which the image printing unit and the controlling unit are connected.

12. The image forming apparatus according to claim 1, wherein
the acquiring section of the controlling unit, when the operating unit receives an operation input instructing printing, acquires the first image processing operation capability information and the second image processing operation capability information and acquires third image processing operation capability information indicative of an image processing operation that a third image processing section is to perform on the first processed image from the third image processing section that is able to perform one or more image processing operations from among a set of third image processing operations on an image, and
the deciding section of the controlling unit decides the image processing operation to be performed by the first image processing section, the image processing operation to be performed by the second image processing section, and the image processing operation to be performed by the third image processing section, using the first image processing operation capability information, the second image processing operation capability information, and the third image processing operation capability information acquired by the acquiring section, and
the notifying section of the controlling unit generates image processing operation specifying information specifying the image processing operations decided by the deciding section and transmits the image processing operation specifying information to the image reading unit, the image printing unit, and the third image processing section.

13. An image forming apparatus comprising:
an image reading unit including
- a reading section that reads an image recorded on a paper medium;
- a first image processing section that is able to perform one or more image processing operations from among a set of first image processing operations on the image read by the reading section to obtain a first processed image; and
- a first generating section that generates first image processing operation capability information indicative of the set of first image processing operations that the first image processing section is able to perform on an image;

an image processing unit including
- a third image processing section that is able to perform one or more image processing operations from among a set of third image processing operations on the first processed image to obtain a third processed image; and
- a third generating section that generates third image processing operation capability information indicative of the set of third image processing operations that the third image processing section is able to perform on an image;

an image printing unit that prints the third processed image;

an operating unit that receives an operation input from a user; and a controlling unit including
- an acquiring section that, when the operating unit receives an operation input instructing printing, acquires the first image processing operation capability information from the first generating section and the third image processing operation capability information from the third generating section;
- a deciding section that decides which image processing operation is to be performed by each of the first image processing section and the third image processing section based on the first image processing operation capability information and the third image processing operation capability information acquired by the acquiring section; and
- a notifying section that generates image processing operation specifying information indicative of the image processing operations decided by the deciding section and transmits the image processing operation specifying information to the image reading unit and the image processing unit.

14. The image forming apparatus according to claim 13, wherein at least two of the image reading unit, the image processing unit, the image printing unit, the operating unit, and the controlling unit are connected by a network.

15. An image forming apparatus comprising:
an image reading and printing unit including
- a reading section that reads an image recorded on a paper medium;
- a first image processing section that is able to perform one or more image processing operations from among a set of first image processing operations on the image read by the reading section to obtain a first processed image;
- a first generating section that generates first image processing operation capability information indicative of the set of first image processing operations that the first image processing section is able to perform on an image; and
- a printing section that prints the first processed image;

an operating unit that receives an operation input from a user; and a controlling unit including
- an acquiring section that, when the operating unit receives an operation input instructing printing, acquires the first image processing operation capability information from the first generating section and acquires third image processing operation capability information, indicative of a set of third image processing operations that a third image processing section is able to perform, from a third image generating section that generates third image processing operation capability information;
- a deciding section that decides which image processing operation is to be performed by each of the first image processing section and the third image processing section based on the first image processing operation capability information and the third image processing operation capability information acquired by the acquiring section; and
- a notifying section that generates image processing operation specifying information indicative of the image processing operations decided by the deciding section and transmits the image processing operation specifying information to the image reading and printing unit and the third image processing section.

16. The image forming apparatus according to claim 15, wherein at least two of the image reading and printing device, the operating unit, and the controlling unit are connected to a common network.

17. The image forming apparatus according to claim 15, wherein at least one of the image reading and printing unit and the controlling unit is connected to a network to which the third image processing section is connected.

* * * * *